US012804279B2

(12) United States Patent
Sato et al.

(10) Patent No.: US 12,804,279 B2
(45) Date of Patent: Nov. 17, 2026

(54) IMAGING ELEMENT AND ELECTRONIC EQUIPMENT

(71) Applicant: Sony Semiconductor Solutions Corporation, Kanagawa (JP)

(72) Inventors: Gota Sato, Kanagawa (JP); Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 90 days.

(21) Appl. No.: 18/730,426

(22) PCT Filed: Nov. 16, 2022

(86) PCT No.: PCT/JP2022/042631
§ 371 (c)(1),
(2) Date: Jul. 19, 2024

(87) PCT Pub. No.: WO2023/166793
PCT Pub. Date: Sep. 7, 2023

(65) Prior Publication Data

US 2025/0159374 A1 May 15, 2025

Related U.S. Application Data

(60) Provisional application No. 63/316,696, filed on Mar. 4, 2022.

(51) Int. Cl.
*H04N 25/673* (2023.01)
*H04N 25/13* (2023.01)
*H04N 25/78* (2023.01)

(52) U.S. Cl.
CPC ......... *H04N 25/673* (2023.01); *H04N 25/136* (2023.01); *H04N 25/78* (2023.01)

(58) Field of Classification Search
CPC .... H04N 25/673; H04N 25/136; H04N 25/78; H04N 25/133; H04N 25/135;
(Continued)

(56) References Cited

U.S. PATENT DOCUMENTS 7,825,966 B2 * 11/2010 Manabe ............... H04N 25/622 348/248
2013/0063635 A1 * 3/2013 Kobayashi ........... H04N 25/704 348/294
(Continued)

FOREIGN PATENT DOCUMENTS

JP 2014161022 A 9/2014
JP 2015230355 A 12/2015
(Continued)

OTHER PUBLICATIONS

International Search Report (PCT/ISA/210), International Application No. PCT/JP2022/042631, dated Dec. 20, 2022.

*Primary Examiner* — Jason A Flohre
(74) *Attorney, Agent, or Firm* — Michael Best & Friedrich LLP

(57) ABSTRACT

Imaging with reduced noise is disclosed. In one example, an imaging element includes a pixel block including a first pixel and a second pixel that performs photoelectric conversion of incident light of a wavelength different from that of the first pixel. An electric charge holding unit holds electric charges of the first and second pixels, and a signal generation unit generates an image signal based on the held electric charges. A pixel block controller controls transfer of the electric charges of the first pixel to generate a first image signal and of the second pixel to generate an added image signal. A signal processing unit switches a first mode for outputting the first image signal and the added image signal and a second mode for outputting the first image signal and
(Continued)

a second image signal obtained by subtracting the first image signal from the added image signal.

6 Claims, 22 Drawing Sheets

(58) Field of Classification Search
CPC ...... H04N 25/131; H04N 25/46; H04N 25/77; H04N 25/60
See application file for complete search history.

(56) References Cited

U.S. PATENT DOCUMENTS

| | | | | |
|---|---|---|---|---|
| 2013/0256510 | A1* | 10/2013 | Lyu | H04N 25/778<br>250/206 |
| 2014/0362190 | A1* | 12/2014 | Takagi | H04N 25/704<br>348/49 |
| 2015/0312537 | A1* | 10/2015 | Solhusvik | H04N 25/133<br>348/302 |
| 2016/0234425 | A1* | 8/2016 | Katagawa | H04N 23/672 |
| 2019/0014276 | A1* | 1/2019 | Cheung | H04N 25/533 |
| 2019/0319056 | A1* | 10/2019 | Yamashita | H04N 23/672 |
| 2021/0258526 | A1* | 8/2021 | Kusaka | G02B 7/346 |
| 2021/0314514 | A1* | 10/2021 | Tada | H04N 25/44 |
| 2021/0409659 | A1* | 12/2021 | Powell | H04N 25/133 |
| 2022/0394219 | A1* | 12/2022 | Jang | H04N 23/843 |

FOREIGN PATENT DOCUMENTS

| | | | |
|---|---|---|---|
| JP | 2017153069 | A | 8/2017 |
| WO | 2013172205 | A1 | 11/2013 |

* cited by examiner

IMAGING ELEMENT AND ELECTRONIC EQUIPMENT

FIELD

The present disclosure relates to an imaging element and electronic equipment.

BACKGROUND imaging elements that share an electric charge holding unit that holds electric charges generated by photoelectric conversion in a plurality of pixels including a photoelectric conversion element that performs photoelectric conversion of incident light and a signal generation unit that generates an image signal corresponding to the electric charges of the electric charge holding unit are used. Among such imaging elements, an imaging element has been proposed in which a pixel corresponding to white light and a pixel corresponding to light other than the white light share the electric charge holding unit (FD unit) and the signal generation unit explained above (see, for example, Patent Document 1.).

CITATION LIST

Patent Literature

Patent Literature 1: WO 2013/172205 A

SUMMARY

Technical Problem

However, in the related art described above, electric charges of pixels corresponding to different colors are individually transferred to the electric charge holding unit to generate an image signal. For this reason, noise is included in the respective image signals. There is a problem in that a signal-to-noise ratio deteriorates at the time of imaging in a dark place.

Therefore, the present disclosure proposes an imaging element and electronic equipment that reduce the influence of noise.

Solution to Problem

The present disclosure has been conceived to solve the problem described above, and a first aspect thereof is an imaging element includes: a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation unit that generates an image signal based on the electric charges held by the electric charge holding unit; a pixel block control unit that performs control to transfer the electric charges generated by the first pixel to the electric charge holding unit and cause the signal generation unit to generate a first image signal that is the image signal based on the electric charges and control to further transfer the electric charges generated by the second pixel to the electric charge holding unit in which the electric charges generated by the first pixel are held and cause the signal generation unit to generate an added image signal that is the image signal based on electric charges obtained by adding up the electric charges respectively generated by the first pixel and the second pixel; and a signal processing unit that includes a subtraction unit that generates a second image signal that is the image signal obtained by subtracting the first image signal from the added image signal, the signal processing unit switching a first mode for outputting the first image signal and the added image signal and a second mode for outputting the first image signal and the second image signal.

DESCRIPTION OF EMBODIMENTS

Figure 1:
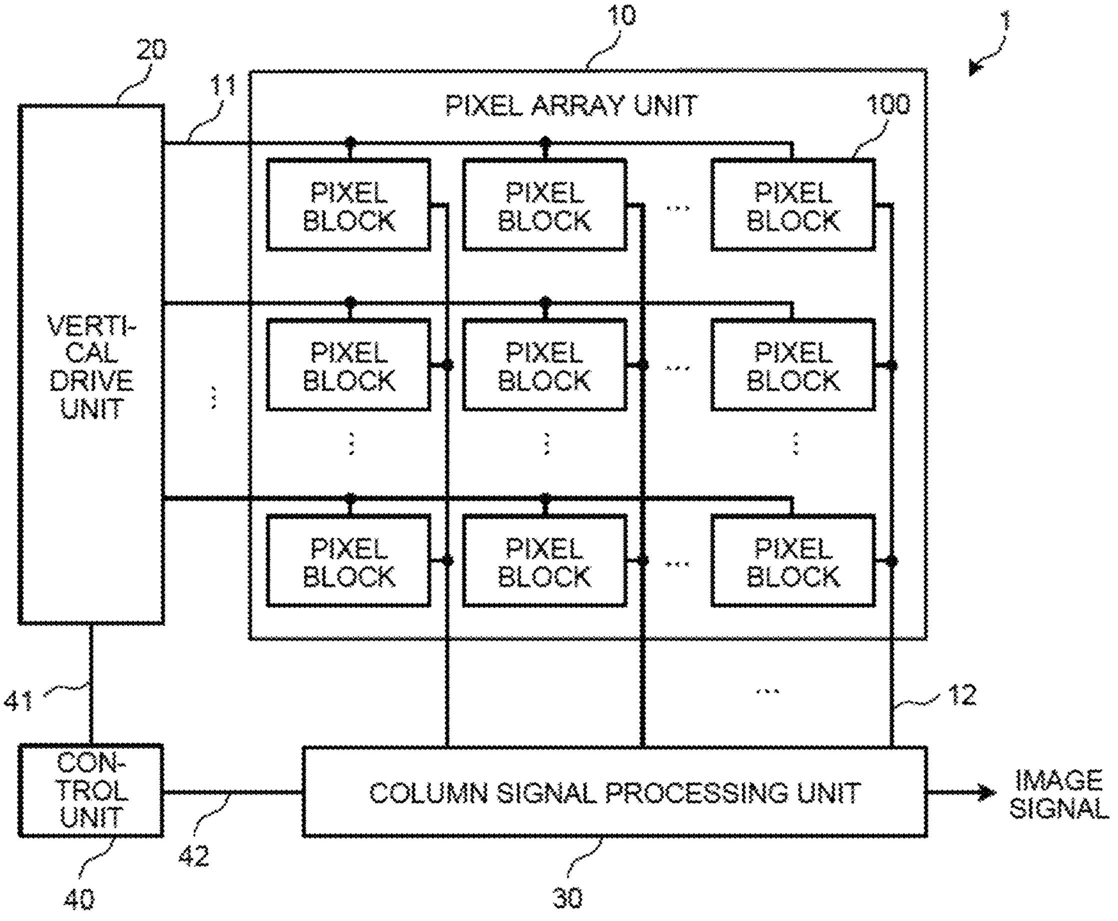
FIG. 1 is a diagram illustrating a configuration example of an imaging element according to an embodiment of the present disclosure.

Embodiments of the present disclosure are explained in detail below with reference to the drawings. Explanation is made in the following order. Note that, in the embodiments explained below, redundant explanation is omitted by denoting the same parts with the same reference numerals and signs.

1. First Embodiment
2. Second Embodiment
3. Third Embodiment
4. Fourth Embodiment
5. Fifth Embodiment
6. Sixth Embodiment
7. Imaging device

1. First Embodiment

Configuration of an Imaging Element

FIG. 1 is a diagram illustrating a configuration example of an imaging element according to an embodiment of the present disclosure. FIG. 1 is a block diagram illustrating a configuration example of the imaging element 1. A semiconductor element according to an embodiment of the present disclosure is explained by taking the imaging element 1 as an example. The imaging element 1 is a semiconductor element that generates image data of a subject. The imaging element 1 includes a pixel array unit 10, a vertical drive unit 20, a column signal processing unit 30, and a control unit 40.

The pixel array unit 10 is configured by arranging a plurality of pixel blocks 100. In the pixel array unit 10, a plurality of pixel blocks 100 are arranged in the shape of a two-dimensional matrix. Here, the pixel block 100 includes a plurality of pixels including a photoelectric conversion unit that performs photoelectric conversion of incident light and an electric charge holding unit (an electric charge holding unit 106 explained below) that holds electric charges generated by the photoelectric conversion. For example, a photodiode can be used for the photoelectric conversion unit. An image signal generation unit (a signal generation unit 120 explained below) is arranged for each pixel block 100. The signal generation unit 120 generates an image signal based on the electric charges held by the electric charge holding unit 106 of the pixel block 100.

A signal line 11 is wired to each pixel block 100 and the signal generation unit 120. The pixel block 100 and the signal generation unit 120 are controlled by a control signal transmitted by the signal line 11. A signal line 12 is wired to the signal generation unit 120. An image signal is output from the signal generation unit 120 to the signal line 12. Note that the signal line 11 is arranged for each row of the shape of the two-dimensional matrix and is wired in common to the plurality of pixel blocks 100 and the plurality of signal generation units 120 arranged in one row. The signal line 12 is arranged in the column direction of the two-dimensional matrix and is wired in common to the plurality of pixel blocks 100 arranged in one column.

The vertical drive unit 20 generates a control signal for the pixel block 100 explained above. The vertical drive unit 20 in the figure generates a control signal for each row of the two-dimensional matrix of the pixel array unit 10 and sequentially outputs the control signal via the signal line 11.

The column signal processing unit 30 processes the image signal generated by the pixel block 100. The column signal processing unit 30 in the figure simultaneously processes image signals from the plurality of pixel blocks 100 arranged in one row of the pixel array unit 10 transmitted via the signal line 12. As this processing, for example, analog-digital conversion for converting an analog image signal generated by the pixel block 100 into a digital image signal and correlated double sampling (CDS) for removing an offset error of an image signal can be performed. The processed image signal is output to a circuit or the like outside the imaging element 1.

The control unit 40 controls the vertical drive unit 20 and the column signal processing unit 30. The control unit 40 in the figure outputs control signals respectively via signal lines 41 and 42 to control the vertical drive unit 20 and the column signal processing unit 30. Note that the vertical drive unit 20 in the figure is an example of a pixel block control unit. The column signal processing unit 30 is an example of a signal processing unit.

Configuration of the Pixel Block

Figure 2:
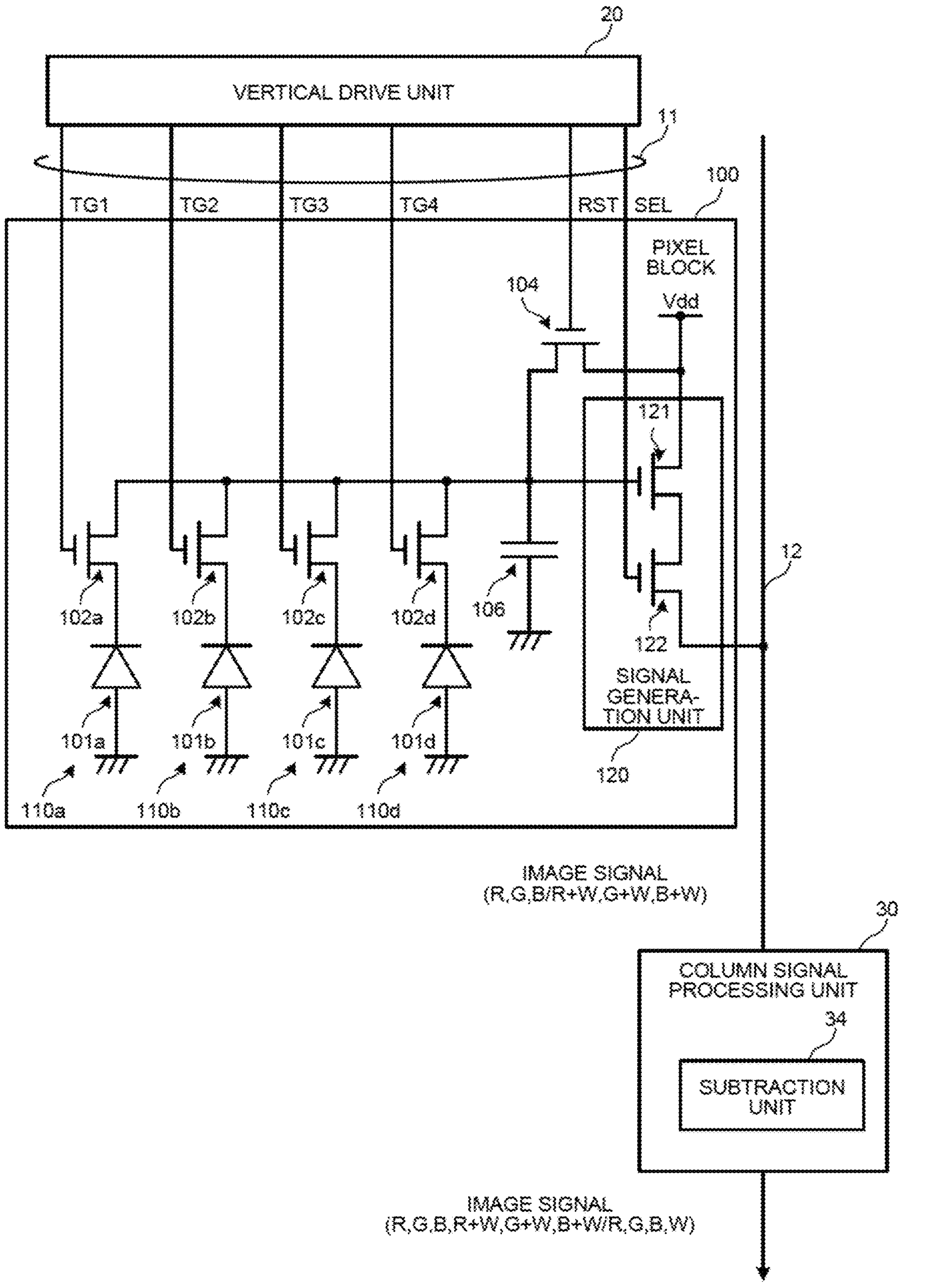
FIG. 2 is a diagram illustrating a configuration example of a pixel block according to a first embodiment of the present disclosure.

FIG. 2 is a diagram illustrating a configuration example of a pixel block according to a first embodiment of the present disclosure. The figure is a circuit diagram illustrating a configuration example of the pixel block 100. Note that the vertical drive unit 20 and the column signal processing unit 30 are further illustrated in the figure. The pixel block 100 in the figure includes pixels 110*a* to 110*d*, the electric charge holding unit 106, the reset transistor 104, and the signal generation unit 120.

The pixel 110*a* includes a photoelectric conversion unit 101*a* and an electric charge transfer unit 102*a*. The pixel 110*b* includes a photoelectric conversion unit 101*b* and an electric charge transfer unit 102*b*. The pixel 110*c* includes a photoelectric conversion unit 101*c* and an electric charge transfer unit 102*c*. The pixel 110*d* includes a photoelectric conversion unit 101*d* and an electric charge transfer unit 102*d*. A photodiode can be used for the photoelectric conversion unit 101*a* to 101*d*. An n-channel MOS transistor can be used for the electric charge transfer unit 102*a* to 102*d*.

The signal generation unit 120 includes an amplification transistor 121 and a selection transistor 122. An n-channel MOS transistors can be used for the reset transistor 104, the amplification transistor 121, and the selection transistor 122. In this n-channel MOS transistor, a drain and a source can be conducted by applying a voltage exceeding a threshold of a gate-source voltage Vgs to the gate. The voltage exceeding the threshold of the gate-source voltage Vgs is hereinafter referred to as ON voltage. A control signal including the ON voltage is referred to as ON signal. The control signal is transmitted by a signal line TG1 or the like.

As explained above, the signal line 11 and the signal line 12 are wired in the pixel block 100. The signal line 11 in the figure includes signal lines TG1 to TG4, a signal line RST, and a signal line SEL. Besides, a power supply line Vdd is wired to the pixel block 100. The power supply line Vdd is a wire that supplies power to the pixel block 100.

An anode of the photoelectric conversion unit 101*a* is grounded and a cathode of the photoelectric conversion unit 101*a* is connected to a source of the electric charge transfer unit 102*a*. An anode of the photoelectric conversion unit 101*b* is grounded and a cathode of the photoelectric conversion unit 101*b* is connected to a source of the electric charge transfer unit 102*b*. An anode of the photoelectric conversion unit 101*c* is grounded and a cathode of the photoelectric conversion unit 101*c* is connected to a source of the electric charge transfer unit 102*c*. An anode of the photoelectric conversion unit 101*d* is grounded and a cathode of the photoelectric conversion unit 101*d* is connected to a source of the electric charge transfer unit 102*d*.

Drains of the electric charge transfer unit 102*a* to 102*d* are connected to a source of the reset transistor 104, a gate of the amplification transistor 121, and one end of the electric charge holding unit 106. The other end of the electric charge holding unit 106 is grounded. A drain of the reset transistor 104 and a drain of the amplification transistor 121 are connected to the power supply line Vdd. A source of the amplification transistor 121 is connected to a drain of the selection transistor 122, and a source of the selection transistor 122 is connected to the signal line 12.

Gates of the electric charge transfer units 102*a* to 102*d* are respectively connected to the signal lines TG1 to TG4. A gate of the reset transistor 104 is connected to the signal line RST and a gate of the selection transistor 122 is connected to the signal line SEL.

The photoelectric conversion units 101*a* to 101*d* perform photoelectric conversion of incident light. The photoelectric conversion units 101*a* to 101*d* can be configured by a photodiode formed on a semiconductor substrate. The photoelectric conversion units 101*a* to 101*d* perform photoelectric conversion of incident light in an exposure period and holds electric charges generated by the photoelectric conversion.

The electric charge holding unit 106 holds the electric charges generated by the photoelectric conversion units 101*a* to 101*d*. The electric charge holding unit 106 can be configured by a floating diffusion (FD) region that is a semiconductor region formed in the semiconductor substrate.

The electric charge transfer units 102*a* to 102*d* transfer electric charges. The electric charge transfer units 102*a* to 102*d* respectively transfer the electric charges generated by the photoelectric conversion units 101*a* to 101*d* to the electric charge holding unit 106. The electric charge transfer unit 102*a* and the like transfer the electric charges by respectively conducting the photoelectric conversion unit 101*a* and the like and the electric charge holding unit 106. Control signals of the electric charge transfer unit 102*a* to 102*h* are respectively transmitted by the signal lines TG1 to TG4.

The reset transistor 104 resets the electric charge holding unit 106. This reset can be performed by conducting the electric charge holding unit 106 and the power supply line Vdd and discharging the electric charges of the electric charge holding unit 106. A control signal of the reset transistor 104 is transmitted by the signal line RST. Note that the reset transistor 104 is an example of a reset unit.

The signal generation unit 120 generates an image signal based on the electric charges held in the electric charge holding unit 106. As explained above, the signal generation unit 120 is configured by the amplification transistor 121 and the selection transistor 122.

The amplification transistor 121 amplifies a voltage of the electric charge holding unit 106. A gate of the amplification transistor 121 is connected to the electric charge holding unit 106. For this reason, an image signal having a voltage corresponding to the electric charges held by the electric charge holding unit 106 is generated at a source of the amplification transistor 121. By conducting the selection transistor 122, this image signal can be output to the signal line 12. A control signal of the selection transistor 122 is transmitted by the signal line SEL.

The photoelectric conversion units 101*a* to 101*d* perform photoelectric conversion of incident light in an exposure period to generate electric charges and accumulate the electric charges in the photoelectric conversion units 101*a* to 101*d*. After the elapse of the exposure period, the electric charges of the photoelectric conversion units 101*a* to 101*d* are transferred to the electric charge holding unit 106 by the electric charge transfer units 102*a* to 102*d* and held. An image signal is generated by the signal generation unit 120 based on the held electric charges.

As explained below, color filters that transmit kinds of incident light having the same wavelength are arranged in the pixel 110*a* and the pixel 110*c*. The pixel 110*a* and the pixel 110*c* are referred to as first pixels. The first pixels perform photoelectric conversion of incident light having a wavelength corresponding to the color filters arranged in the first pixels. In the first pixels, for example, color filters that transmit, for example, any of red light, green light, and blue light can be arranged.

In the pixel 110*b* and the pixel 110*d*, color filters that transmit incident light having a wavelength different from that of the color filters of the pixel 110*a* and the pixel 110*c*, which are the first pixels, are arranged. The pixel 110*b* and the pixel 110*d* are referred to as second pixels. The second pixels perform photoelectric conversion of incident light having a wavelength different from that of the first pixels. In the second pixels, for example, color filters that transmit white light can be arranged.

As explained above, in the pixel block 100, the pixels 110*a* to 110*d* share the electric charge holding unit 106, the reset transistor 104, and the signal generation unit 120. For this reason, it is possible to individually generate image signals of the pixels 110*a* to 110*d* and simultaneously generate image signals of a plurality of pixels 110 among the pixels 110*a* to 110*d*.

For example, when image signals of the pixel 110*a* and the pixel 110*c*, which are the first pixels, are generated, the image signals can be generated by simultaneously conducting the electric charge transfer units 102*a* and 102*c* to transfer electric charges of the photoelectric conversion units 101*a* and 101*d* to the electric charge holding unit 106 and causing the signal generation unit 120 to generate an image signal. The image signal generated based on the electric charges of the first pixels is referred to as first image signal. Since the color filters corresponding to the red light, the green light, and the blue light are arranged in the first pixels, image signals corresponding to the red light, the green light, and the blue light are generated. Note that the image signals corresponding to the red light, the green light, and the blue light are respectively referred to as R image signal, G image signal, and B image signal. The R image signal, the G image signal, and the B image signal are equivalent to the first image signal. “R”, “G”, and “B” in the figure respectively represent the R image signal, the G image signal, and the B image signal.

It is also possible to further transfer the electric charges of the second pixels (the pixel 110*b* and the pixel 110*d*) to the electric charge holding unit 106 after transferring the electric charges of the first pixels (the pixel 110*a* and the pixel 110*c*) to the electric charge holding unit 106. Specifically, after the first image signal explained above is generated, in a state in which the electric charges of the first pixels in the electric charge holding unit 106 are held, the electric charge transfer units 102*b* and 102*d* are conducted and the electric charges of the second pixels (the pixel 110*b* and the pixel 110*d*) are added up. Subsequently, by causing the signal generation unit 120 to generate an image signal, it is possible to generate an image signal based on electric charges obtained by adding up the electric charges respectively generated by the first pixels and the second pixels. This image signal is referred to as added image signal. Since the color filters corresponding to the white light is arranged in the second pixels, the added image signal is an image signal obtained by adding an image signal corresponding to the white light to image signals corresponding to the red light, the green light, and the blue light.

Note that an image signal obtained by adding the image signal corresponding to the white light to the image signal corresponding to the red light is referred to as R+W image signal. An image signal obtained by adding the image signal corresponding to the white light to the image signal corresponding to the green light is referred to as G+W image signal. An image signal obtained by adding the image signal corresponding to the white light to the image signal corresponding to the blue light is referred to as B+W image signal. The R+W image signal, the G+W image signal, and the B+W image signal are equivalent to the added image signal. “R+W”, “G+W”, and “B+W” in the figure respectively represent an R+W image signal, a G+W image signal, and a B+W image signal.

The vertical drive unit 20 in the figure outputs a control signal to the pixel block 100 via the signal line TG1 or the like and performs control to cause the pixel block 100 to generate the first image signal and the added image signal. That is, the vertical drive unit 20 performs control to transfer the electric charges generated by the first pixels to the electric charge holding unit 106 and cause the signal generation unit 120 to generate the first image signal. The vertical drive unit 20 further performs control to further transfer the electric charges generated by the second pixels to the electric charge holding unit 106 holding the electric charges generated by the first pixels and cause the signal generation unit 120 to generate the added image signal. Prior to generation of the first image signal, the vertical drive unit 20 further performs control to reset the electric charge holding unit 106.

The vertical drive unit 20 further performs control to cause the signal generation unit 120 to generate an image signal at a reset time. This image signal is referred to as image signal at the reset time. CDS explained below can be performed by the image signal at the reset time. The image signal at the reset time is an example of a reference image signal.

Note that an image signal based on the electric charges of the second pixels can be generated by subtracting the first image signal from the added image signal. This image signal is referred to as second image signal. As explained above, since the color filters corresponding to the white light are arranged in the second pixels (the pixel 110*b* and the pixel 110*d*), the second image signal is an image signal corresponding to the white light. Note that the image signal corresponding to the white light is referred to as W image signal. The W image signal is equivalent to the second image signal.

The column signal processing unit 30 in the figure processes the first image signal and the added image signal. A subtraction unit 34 is disposed in the column signal processing unit 30. The subtraction unit 34 subtracts the first image signal from the added image signal to generate the second image signal. The column signal processing unit 30 can switch a mode for outputting the first image signal (the R image signal, the G image signal, and the B image signal) and the added image signal (the R+W image signal, the G+W image signal, and the B+W image signal) and a mode for outputting the first image signal and the second image signal (the W image signal) generated by the subtraction unit 34. The mode for outputting the first image signal and the added image signal is referred to as first mode. The mode for outputting the first image signal and the second image signal is referred to as second mode. The modes can be switched based on, for example, the control of the control unit 40 illustrated in FIG. 1. Note that “W” in the figure represents the W image signal.

Configuration of a Plane of the Pixel Block

Figure 3:
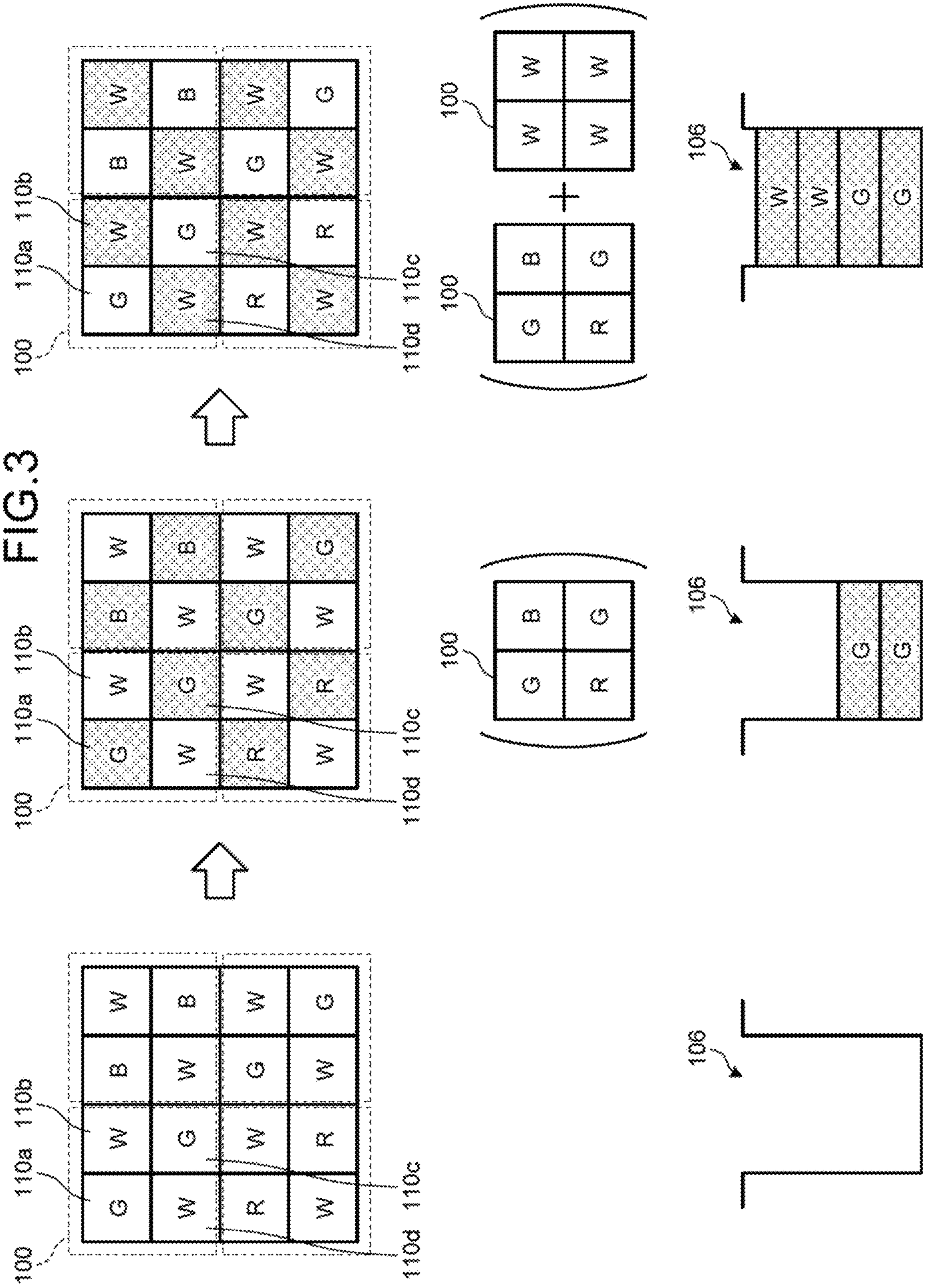
FIG. 3 is a diagram illustrating a configuration example of the pixel block according to the first embodiment of the present disclosure.

FIG. 3 is a diagram illustrating a configuration example of the pixel block according to the first embodiment of the present disclosure. The figure is a plan view illustrating a configuration example of the pixel block 100. Note that the figure further illustrates a state of the electric charge holding unit 106 at the reset time, at the first image signal generation time, and at the added image signal generation time.

A configuration of the pixel block 100 is explained with reference to a figure at the left end in an upper part of the figure. In the figure at the left end in the upper part of the figure, rectangles represent the pixels 110*a* to 110*d*. A dotted rectangle represents the pixel block 100. The pixel block 100 in the figure represents an example in which the pixels 110*a* to 110*d* are arranged in two rows and two columns. Characters attached to the pixel 110*a* and the like in the figure represent types of image signals to be generated.

In the figure at the left end of the upper part of the figure, in an upper left pixel block 100 and a lower right pixel block 100, the first pixels (the pixel 110*a* and the pixel 110*c*) generate the G image signal and the second pixels (the pixel 110*b* and the pixel 110*d*) generate the W image signal. In the upper right pixel block 100, the first pixels (the pixel 110*a* and the pixel 110*c*) generate the B image signal and the second pixels (the pixel 110*b* and the pixel 110*d*) generate the W image signal. In the lower left pixel block 100, the first pixels (the pixel 110*a* and the pixel 110*c*) generate the R image signal and the second pixels (the pixel 110*b* and the pixel 110*d*) generate the W image signal. The four pixel blocks 100 explained above are arrayed in the pixel array unit 10. As explained above, in the pixel block 100, two first pixels and two second pixels are arranged in a square matrix of 2 rows and 2 columns and the first pixels and the second pixels are alternately arranged in the row direction and the column direction.

Note that a lower part of the figure is a potential diagram illustrating a state of the electric charge holding unit 106 of the upper left pixel block 100. The left end of the figure illustrates states of the pixel block 100 and the electric charge holding unit 106 at the reset time. By the reset, the electric charges of the electric charge holding unit 106 are discharged.

The center of the figure represents a state in which the electric charges of the first pixels are transferred to the electric charge holding unit 106. At this time, the first image signal is generated. In the figure of the pixel block 100, pixels to which point hatching is added represent pixels to which the electric charges are transferred. As illustrated in the figure, the electric charges of the first pixels (the pixel 110*a* and the pixel 110*c*) are transferred to the electric charge holding unit 106. Parenthesized portions in the figure represent image signals generated by the signal generation units 120 of the respective pixel blocks 100. In four pixel blocks 100, the R image signal, the G image signal, and the B image signal are generated. The electric charge holding unit 106 holds the electric charges of the first pixels (the pixel 110*a* and the pixel 110*c*). Rectangles to which "G" is added in the potential diagram of the electric charge holding unit 106 in the figure represent electric charges from the first pixels (the pixel 110*a* and the pixel 110*c*).

As explained above, the electric charges of the second pixels are transferred to the electric charge holding unit 106 and added without resetting the electric charge holding unit 106 after generating the first image signal. Accordingly, a level of an image signal can be increased and a signal-to-noise ratio can be improved. Since the added image signal is generated by adding up the electric charges of the first pixels and the electric charges of the second pixels, noise components included in the respective electric charges are leveled. Accordingly, noise of the added image signal can also be reduced.

The right end of the figure represents a state in which the electric charges of the second pixels are transferred to the electric charge holding unit 106. At this time, the added image signal is generated. In the figure of the pixel block 100, pixels to which point hatching is added represent pixels to which the electric charges are transferred. As illustrated in the figure, the electric charges of the second pixels (the pixel 110*b* and the pixel 110*d*) are transferred to the electric charge holding unit 106. In the parenthesized portion of the figure, an added image signal obtained by adding the W signal to the R image signal, the G image signal, and the B image signal in the four pixel blocks 100 is generated. The electric charge holding unit 106 holds the electric charges of the first pixels (the pixel 110*a* and the pixel 110*c*) and the electric charges of the second pixels (the pixel 110*b* and the pixel 110*d*). Rectangles to which "W" is added described in the potential diagram of the electric charge holding unit 106 in the figure represent electric charges from the second pixels (the pixel 110*a* and the pixel 110*c*).

Configuration of the Column Signal Processing Unit

Figure 4:
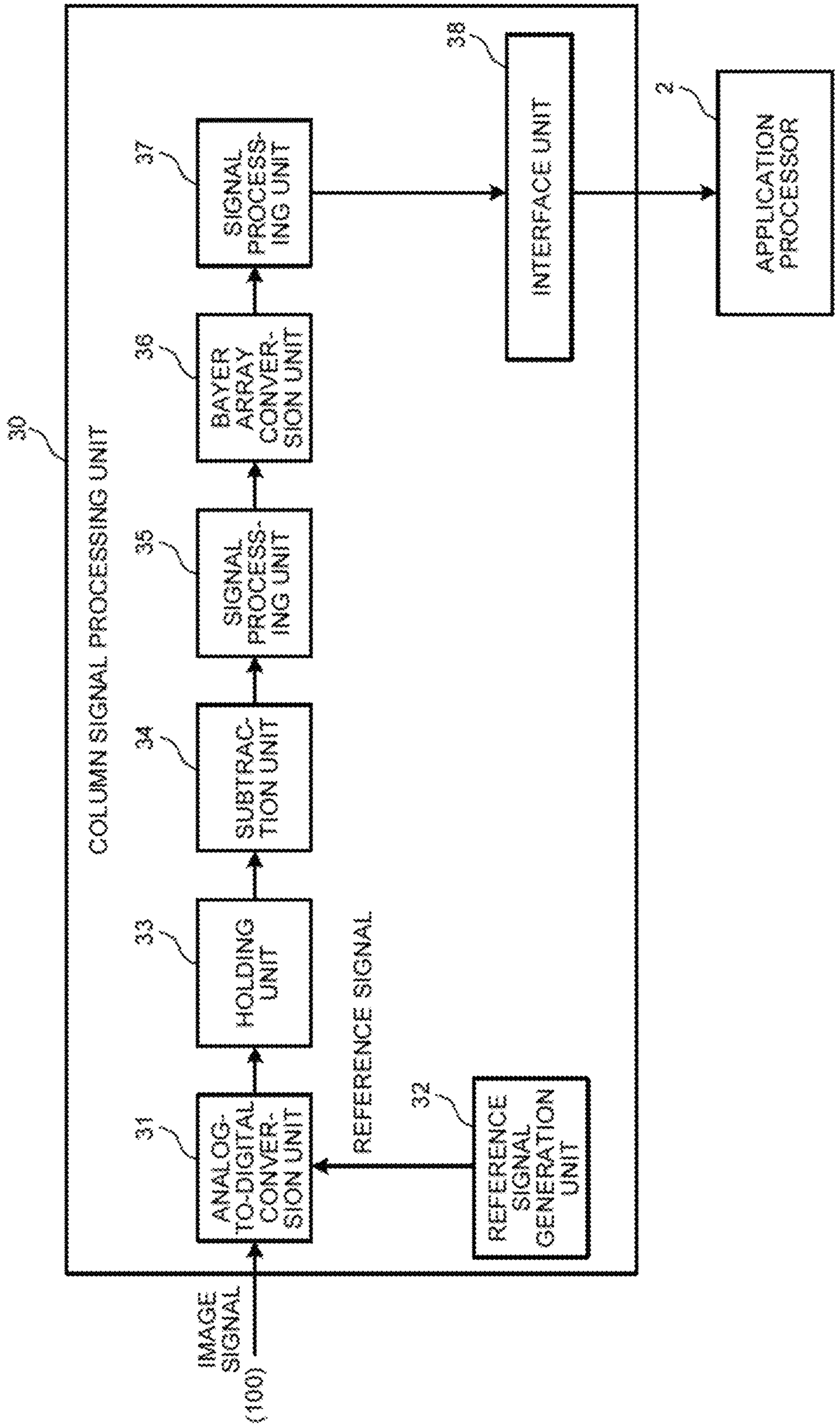
FIG. 4 is a diagram illustrating a configuration example of a column signal processing unit according to the first embodiment of the present disclosure.

FIG. 4 is a diagram illustrating a configuration example of the column signal processing unit according to the first embodiment of the present disclosure. The figure is a block diagram illustrating a configuration example of the column signal processing unit 30. The column signal processing unit 30 in the figure includes a reference signal generation unit 32, an analog-to-digital conversion unit 31, a holding unit 33, a subtraction unit 34, a signal processing unit 35, a Bayer array conversion unit 36, a signal processing unit 37, and an interface unit 38.

The reference signal generation unit 32 generates a reference signal and supplies the reference signal to the analog-to-digital conversion unit 31. This reference signal is a signal, a value of which changes in a ramp function manner.

The analog-to-digital conversion unit 31 performs analog-to-digital conversion of an image signal. The analog-to-digital conversion unit 31 converts an analog image signal generated by the pixel 110 into a digital image signal. The analog-to-digital conversion unit 31 in the figure converts an analog image signal into a digital image signal based on the reference signal output from the reference signal generation unit 32. Specifically, the analog-to-digital conversion unit 31 compares the analog image signal with the reference signal and detects a period until the analog image signal and the reference signal coincide. Since the reference signal is a signal of a voltage corresponding to an elapsed time, a period from the start of the output of the reference signal until the reference signal coincides with the analog image signal is a period corresponding to the voltage of the analog image signal. By outputting a digital signal corresponding to this period, the analog image signal can be converted into the digital image signal.

The holding unit 33 holds an image signal converted into a digital signal by the analog-to-digital conversion unit 31. The holding unit 33 can perform CDS. This CDS is processing of removing an offset (noise) from the image signal by taking a difference of the image signal at the reset time. In the electric charge holding unit 106 explained with reference to FIG. 2, electric charges not discharged in the reset remain. A signal component based on the remaining electric charges becomes an offset component of the image signal and causes noise. Therefore, it is possible to remove the offset component by holding the image signal at the reset time and subtracting the image signal at the reset time from the first image signal or the added image signal. The holding unit 33 in the figure can hold the image signal at the reset time and perform processing of subtracting the image signal at the reset time from the first image signal. By performing this CDS, noise of the image signal can be reduced.

The subtraction unit 34 subtracts the first image signal from the added image signal to generate the second image signal as explained above.

The signal processing unit 35 selects, according to a mode, an image signal to be output. The signal processing unit 35 outputs the first image signal and the added image signal when the first mode is selected and outputs the first image signal and the second image signal when the second mode is selected.

The Bayer array conversion unit 36 converts the first image signal or the like into a Bayer array image signal.

The signal processing unit 37 performs processing such as interpolation processing for the image signal.

The interface unit 38 performs exchange with an external device. The interface unit 38 in the figure performs exchange with an application processor.

Generation of an Image Signal

Figure 5:
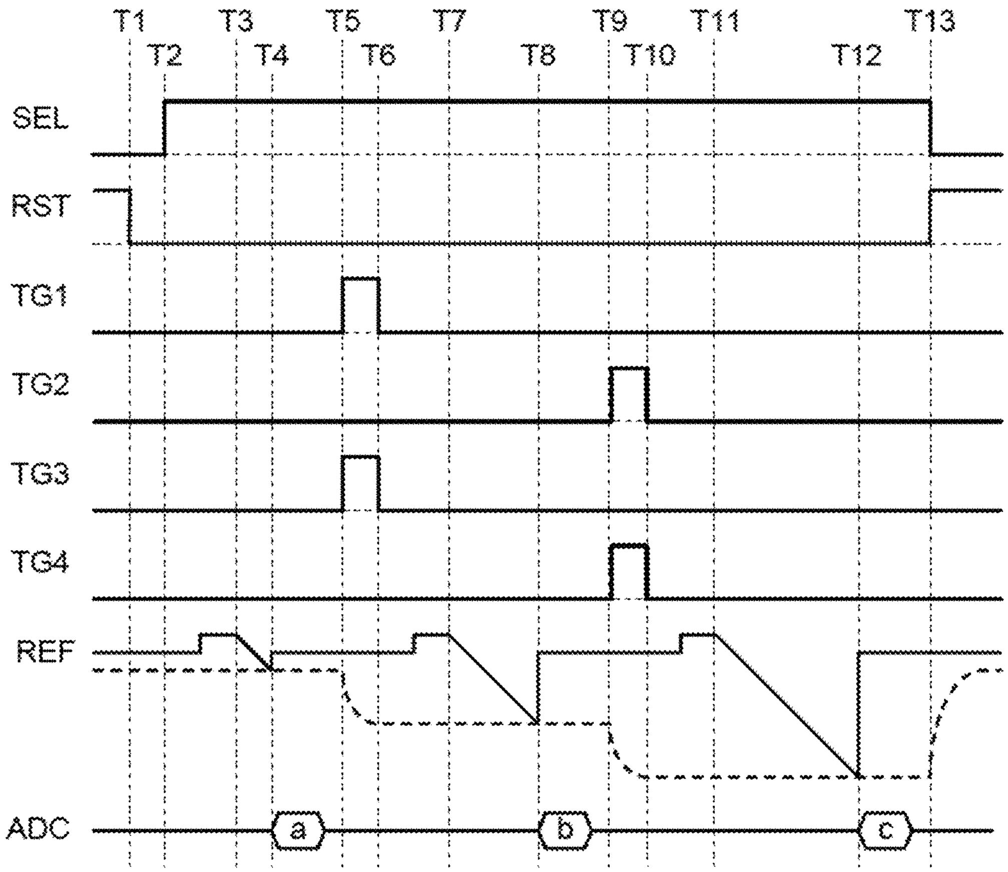
FIG. 5 is a diagram illustrating an example of generation of an image signal according to the first embodiment of the present disclosure.

FIG. 5 is a diagram illustrating an example of generation of an image signal according to the first embodiment of the present disclosure. The figure is a timing chart illustrating an example of generation of the first image signal and the added image signal in the pixel block 100.

"SEL", "RST", "TG1", "TG2", "TG3", and "TG4" in the figure represent signals of the signal line SEL, the signal line RST, the signal line TG1, the signal line TG2, and the signal lines TG3 and TG4 in the pixel block 100. "REF" represents a waveform of the reference signal output from the reference signal generation unit 32 explained with reference to FIG. 4. "ADC" represents the output of the analog-to-digital conversion unit 31.

In the signals of "SEL", "RST", "TG1", "TG2", "TG3", and "TG4", a portion of a value "1" of a binarized waveform represents an ON voltage (Von). A portion of a value "0" represents an OFF voltage. A broken line in the figure represents a level of the OFF voltage. Note that a dotted line in the figure represents the potential of the electric charge holding unit 106.

In an initial state, the OFF voltage is input to the signal line SEL, the signal line TG1, the signal line TG2, and the signal lines TG3 and TG4. The ON voltage is input to the signal line RST. Since the reset transistor 104 comes into a conduction state, the electric charge holding unit 106 is reset. Exposure is performed in a period up to T1. Note that the exposure can be started by conducting the electric charge transfer unit 102*a* and the like together with the reset transistor 104.

At T1, the input of the ON voltage of the reset signal line RST is stopped. Accordingly, the reset of the electric charge holding unit 106 is stopped.

At T2, the ON voltage is input from the signal line SEL. Accordingly, the pixel block 100 is selected.

In a period of T3 to T4, the reference signal generation unit 32 outputs a ramp function-shaped reference signal and the analog-to-digital conversion unit 31 performs analog-to-digital conversion. "a" in the figure represents a conversion result. This corresponds to the digital image signal at the reset time. The image signal at the reset time is held by the holding unit 33.

At T5, the ON voltage is input from the signal lines TG1 and TG3 and the electric charge transfer units 102*a* and 102*c* come into a conduction state. Accordingly, the electric charges accumulated in the photoelectric conversion units 101*a* and 101*c* are transferred to the electric charge holding unit 106.

At T6, the input of the ON voltage from the signal lines TG1 and TG3 is stopped and the electric charge transfer units 102*a* and 102*c* come into a non-conduction state.

In a period of T7 to T8, the reference signal generation unit 32 outputs the reference signal and the analog-to-digital conversion unit 31 performs analog-to-digital conversion. "b" in the figure represents a conversion result. This corresponds to a digital first image signal. CDS can be performed by subtracting the digital image signal at the reset time from the digital first image signal.

At T9, the ON voltage is input from the signal lines TG2 and TG4 and the electric charge transfer units 102*b* and 102*d* come into a conduction state. Accordingly, the electric charges accumulated in the photoelectric conversion units 101*b* and 101*d* are transferred to the electric charge holding unit 106.

At T10, the input of the ON voltage from the signal lines TG2 and TG4 is stopped and the electric charge transfer units 102*b* and 102*d* come into a non-conduction state.

In a period of T11 to T12, the reference signal generation unit 32 outputs the reference signal and the analog-to-digital conversion unit 31 performs analog-to-digital conversion. "c" in the figure represents a conversion result. This corresponds to a digital added image signal. CDS can be performed by subtracting the digital image signal at the reset time from the digital added image signal.

At T13, the application of the ON voltage of the signal line SEL is stopped and the pixel block 100 comes into an unselected state. Further, the ON voltage is applied from the signal line RST and the reset transistor 104 comes into a conduction state. Accordingly, the state returns to the initial state.

According to the above procedure, the first image signal and the added image signal can be generated in the pixel block 100.

As explained above, the imaging element 1 in the first embodiment of the present disclosure generates the added image signal obtained by adding the electric charges of the second pixels to the electric charges of the first pixels. Accordingly, the signal level can be increased and the signal-to-noise ratio can be improved.

2. Second Embodiment

The imaging element 1 in the first embodiment explained above outputs the first image signal and the added image signal. In contrast, the imaging element 1 according to a second embodiment of the present disclosure is different from the first embodiment explained above in that a bit width of the added image signal is aligned with a bit width of the first image signal and the first image signal and the added image signal are output.

Image Signal

Figure 6:
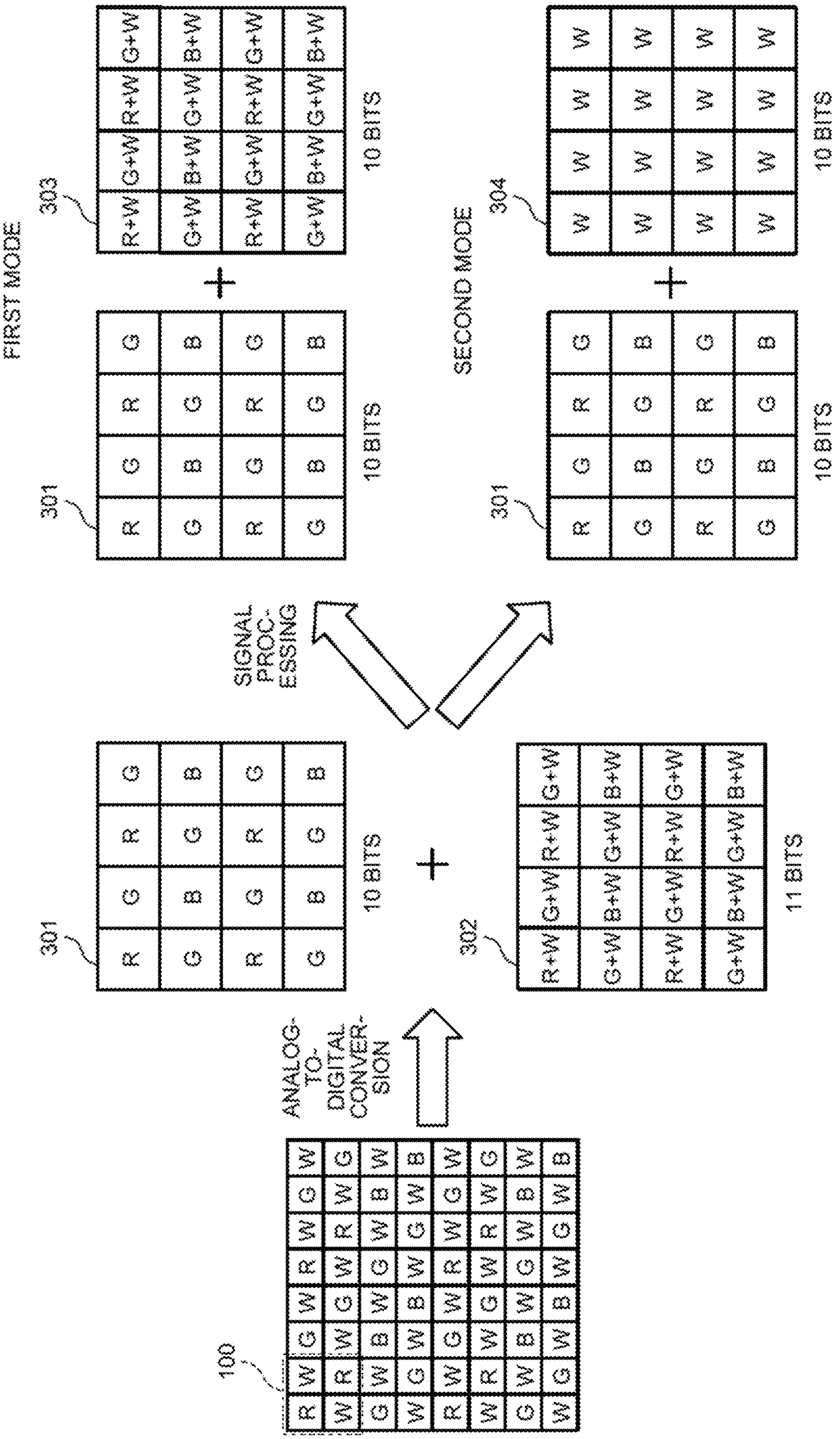
FIG. 6 is a diagram illustrating an example of an image signal according to a second embodiment of the present disclosure.

FIG. 6 is a diagram illustrating an example of an image signal according to the second embodiment of the present disclosure. FIG. 6 is a diagram illustrating an image signal according to the second embodiment of the present disclosure. A figure at the left end of the figure illustrates an array of the pixel block 100. The first image signal and the added image signal are generated from the pixel block 100.

The generated first image signal and the generated added image signal are analog-to-digital converted into a digital first image signal and a digital added image signal. A figure in the middle of the figure illustrates an array of a digital first image signal 301 and a digital added image signal 302. As illustrated in the figure, the digital first image signal 301 is a 10-bit wide signal and the digital added image signal 302 is a 11-bit wide signal.

signal processing is performed on the digital first image signal 301 and the digital added image signal 302. A figure at the right end of the figure illustrates an image signal after the signal processing. An upper part illustrates an output signal in the first mode. In the first mode, the 10-bit wide first image signal 301 and the 10-bit wide added image signal 303 are output. A lower part illustrates an output signal in the second mode. In the second mode, the 10-bit wide first image signal 301 and a 10-bit wide second image signal are output.

Generation of the Added Image Signal

Figure 7:
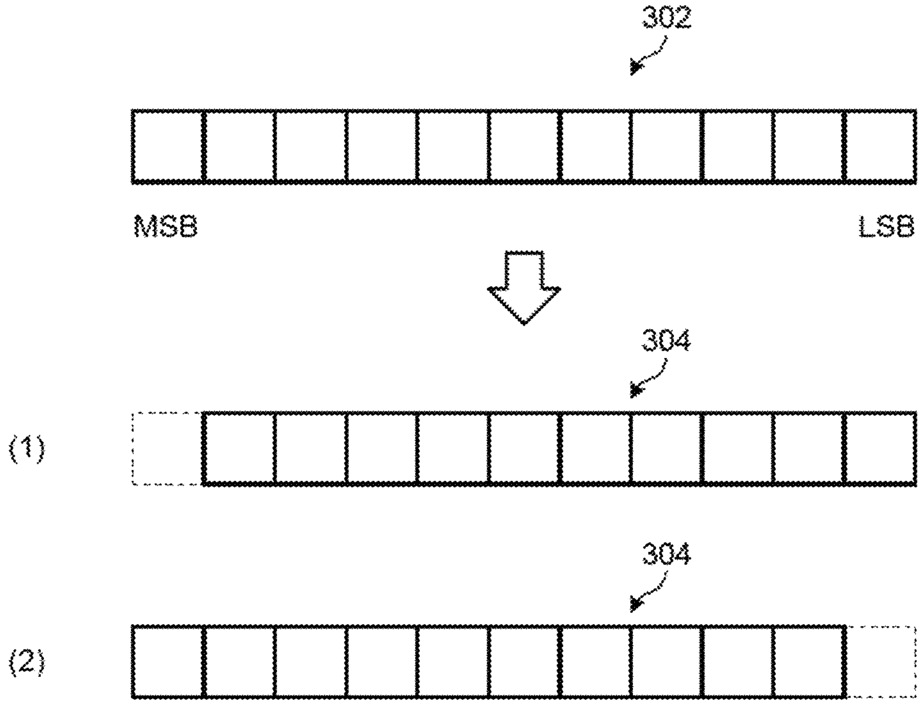
FIG. 7 is a diagram illustrating an example of added image signal generation according to the second embodiment of the present disclosure.

FIG. 7 is a diagram illustrating an example of added image signal generation according to the second embodiment of the present disclosure. The figure is a diagram for explaining a procedure for converting the bit width of the 11-bit wide added image signal 302 into 10 bits.

(1) of the figure illustrates an example in which the most significant bit of the 11-bit wide added image signal 302 is reduced to be converted into a 10-bit width. Since a signal of the least significant bit is held, it is suitable if this scheme is applied when the image quality of a dark part is prioritized.

(2) of the figure illustrates an example in which the least significant bit of the 11-bit wide added image signal 302 is reduced to be converted into a 10-bit width. Since a signal of the most significant bit is held, it is suitable if this scheme is applied when the image quality of a bright part is prioritized.

As explained above, by aligning the bit widths of the image signals to be output, it is possible to simplify treatment of signals in devices at later stages. Note that, by selecting the second mode, transmitting the 10-bit wide first image signal and the 10-bit wide second image signal to an external device, and adding up the first image signal and the second image signal after the transmission to generate the added image signal, it is possible to prevent signal missing of the added image signal.

Components of the imaging element 1 other than the above are the same as the components of the imaging element 1 in the first embodiment of the present disclosure. Therefore, explanation of the components is omitted.

As explained above, the imaging element 1 according to the second embodiment of the present disclosure can align the bit widths of the first image signal and the added image signal by adjusting the bit width of the added image signal. Accordingly, it is possible to simplify treatment of signals in devices at later stages.

3. Third Embodiment

The imaging element 1 in the first embodiment explained above adds up the electric charges of the pixels corresponding to the kinds of incident light having the same wavelength. In contrast, the imaging element 1 according to a third embodiment of the present disclosure is different from the first embodiment explained above in that electric charges of pixels corresponding to kinds of incident light having different wavelengths are added up.

[Configuration of an Image Block]

Figure 8:
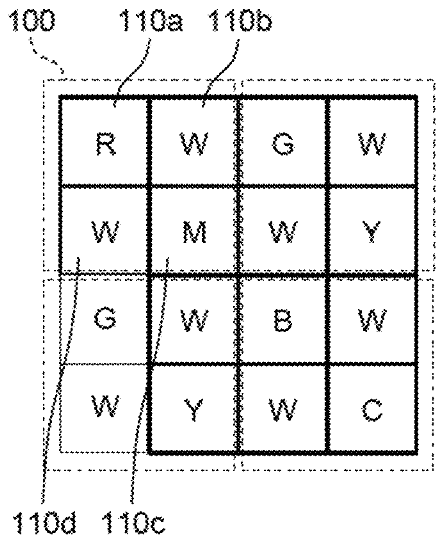
FIG. 8 is a diagram illustrating a configuration example of an image block according to a third embodiment of the present disclosure.

FIG. 8 is a diagram illustrating a configuration example of an image block according to the third embodiment of the present disclosure. The figure is a figure illustrating a configuration example of the pixel block 100.

The pixel block 100 in the figure illustrates an example in which the pixel 110 corresponding to yellow light, the pixel 110 corresponding to reddish violet light, and the pixel 110 corresponding to bluish green light are further arranged besides the pixel 110 corresponding to red light, the pixel 110 corresponding to green light, the pixel 110 corresponding to blue light, and the pixel 110 corresponding to white light. In the figure, "Y", "M", and "C" respectively represent image signals corresponding to the yellow light, the reddish violet light, and the bluish green light.

In the pixel block 100 in the upper left of the figure, the pixel 110*a* generates an R image signal, the pixel 110*c* generates an M image signal, and the pixel 110*b* and the pixel 110*d* generate a W image signal. In the pixel block 100 in the upper right, the pixel 110*a* generates a G image signal, the pixel 110*c* generates a Y image signal, and the pixel 110*b* and the pixel 110*d* generate a W image signal. In the pixel block 100 in the lower left, the pixel 110*a* generates a G image signal, the pixel 110*c* generates a Y image signal, and the pixel 110*b* and the pixel 110*d* generate a W image signal. In the pixel block 100 in the lower right, the pixel 110*a* generates a B image signal, the pixel 110*c* generates a C image signal, and the pixel 110*b* and the pixel 110*d* generate a W image signal. The four pixel blocks 100 explained above are arrayed in the pixel array unit 10.

Transfer of Electric Charges of the Pixel Block

Figure 9:
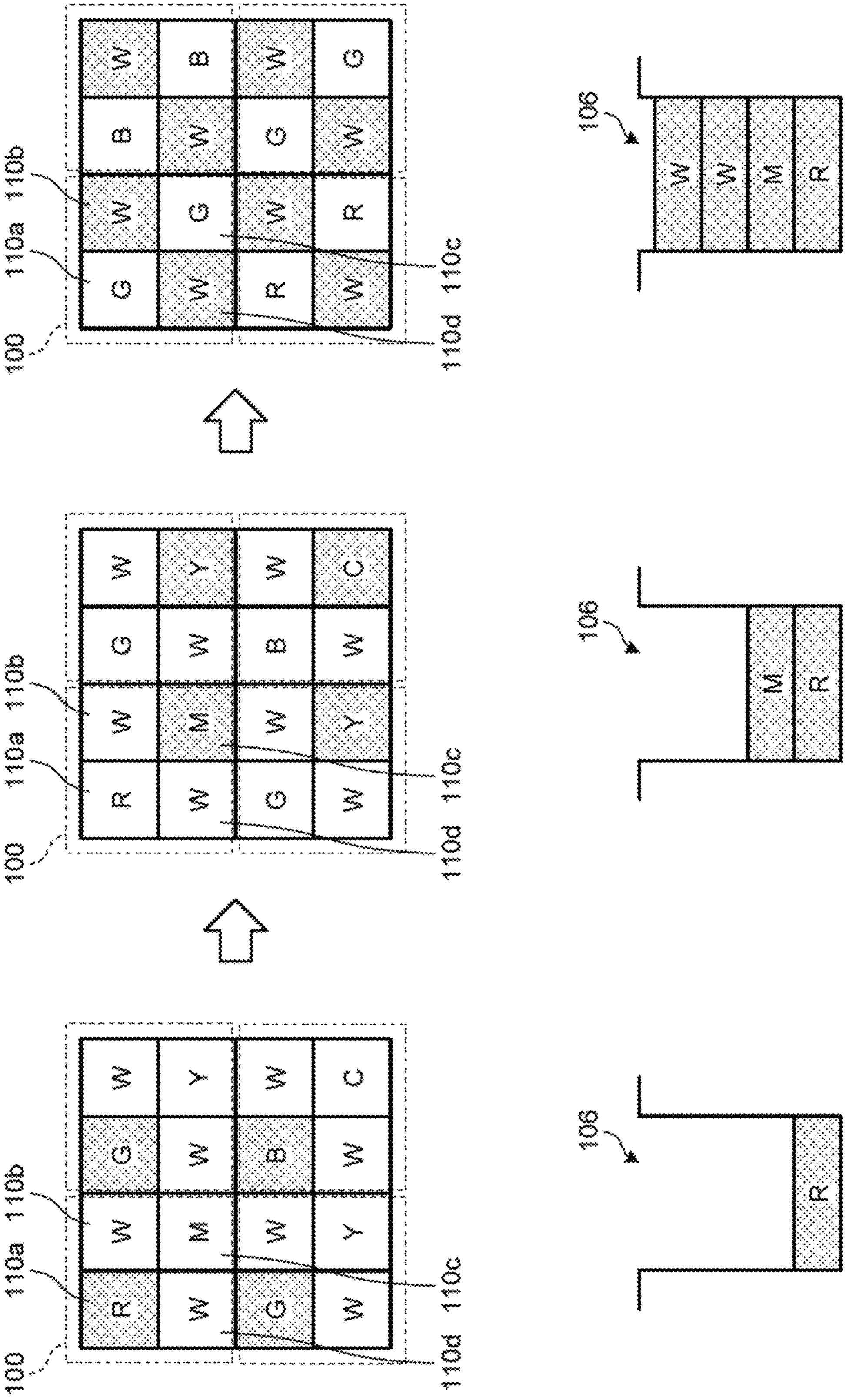
FIG. 9 is a diagram illustrating an example of transfer of electric charge of the pixel block according to the third embodiment of the present disclosure.

FIG. 9 is a diagram illustrating an example of transfer of electric charges of the pixel block according to the third embodiment of the present disclosure. The figure is a diagram for explaining transfer of electric charges of the pixel 110 of the pixel block 100 after reset. The pixel block 100 in the upper left of the figure is explained as an example. First, electric charges of the pixel 110*a* are transferred to the electric charge holding unit 106. At this time, an image signal is generated. Subsequently, electric charges of the pixel 110*c* are transferred to the electric charge holding unit 106 and added. At this time, an image signal is generated. Subsequently, electric charges of the pixel 110*b* and the pixel 110*d* are transferred and added. At this time, an image signal is generated. In this manner, the pixel block 100 in the figure generates three image signals.

Generation of an Image Signal

Figure 10:
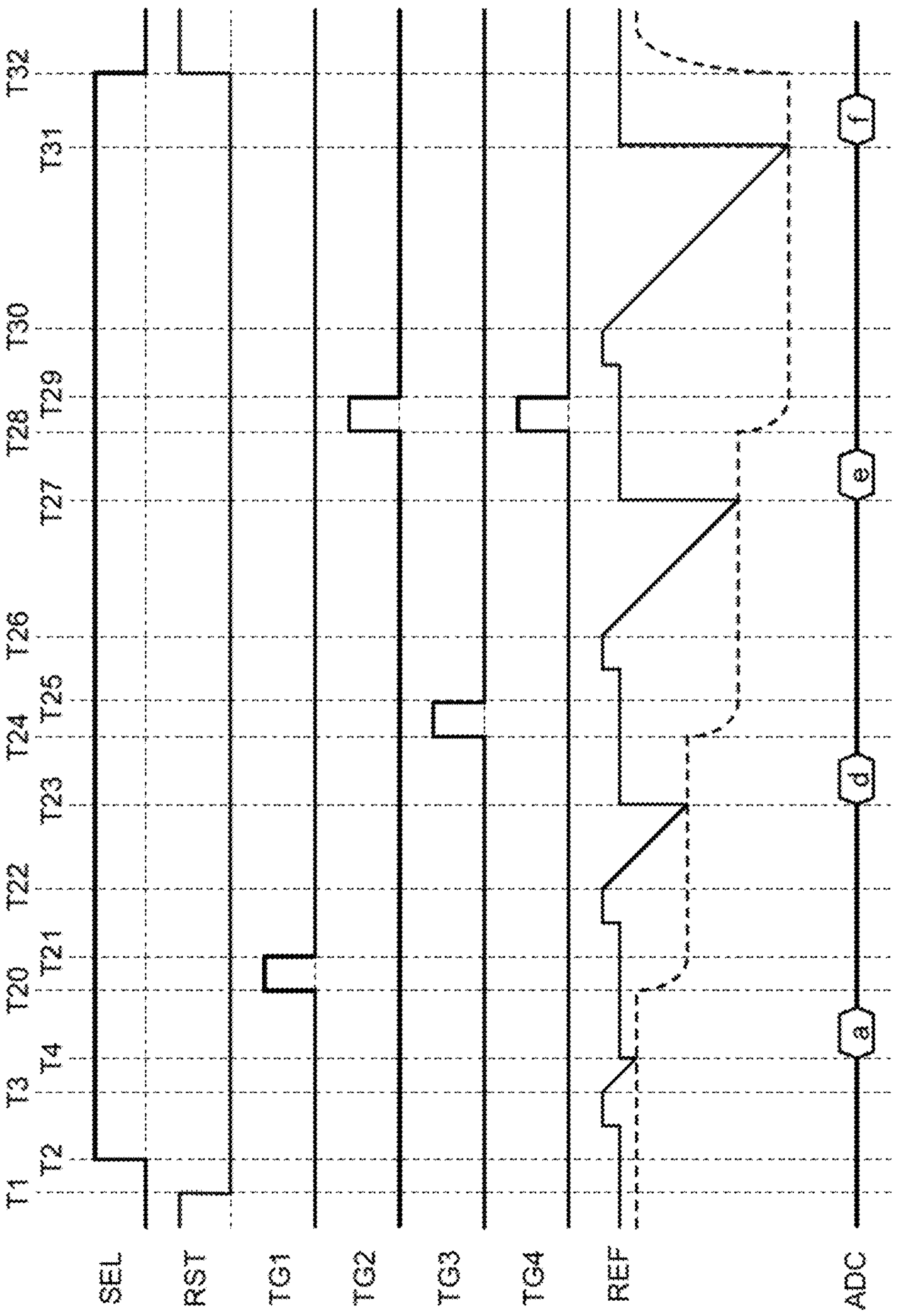
FIG. 10 is a diagram illustrating an example of generation of an image signal according to the third embodiment of the present disclosure.

FIG. 10 is a diagram illustrating an example of generation of an image signal according to the third embodiment of the present disclosure. The figure is a timing chart illustrating an example of generation of a first image signal and an added image signal in the pixel block 100 as in FIG. 5. The same processing as the processing in FIG. 5 can be applied to processing up to T20.

At T20, the ON voltage is input from the signal line TG1 and the electric charge transfer unit 102*a* comes into a conduction state. Accordingly, the electric charges accumulated in the photoelectric conversion unit 101*a* are transferred to the electric charge holding unit 106.

At T21, the input of the ON voltage from the signal line TG1 is stopped and the electric charge transfer unit 102*a* comes into a non-conduction state.

In a period of T22 to T23, the reference signal generation unit 32 outputs the reference signal and the analog-to-digital conversion unit 31 performs analog-to-digital conversion. "d" in the figure represents an image signal of a conversion result.

At T24, the ON voltage is input from the signal line TG3 and the electric charge transfer unit 102*c* comes into a conduction state. Accordingly, the electric charges accumulated in the photoelectric conversion unit 101*c* are transferred to the electric charge holding unit 106.

At T25, the input of the on-voltage from the signal line TG3 is stopped and the electric charge transfer unit 102*c* comes into a non-conduction state.

In a period of T26 to T27, the reference signal generation unit 32 outputs the reference signal and the analog-to-digital conversion unit 31 performs analog-to-digital conversion. "e" in the figure represents an image signal of a conversion result.

At T28, the ON voltage is input from the signal lines TG2 and TG4 and the electric charge transfer units 102*b* and 102*d* come into a conduction state. Accordingly, the electric charges accumulated in the photoelectric conversion units 101*b* and 101*d* are transferred to the electric charge holding unit 106.

At T29, the input of the ON voltage from the signal lines TG2 and TG4 is stopped and the electric charge transfer units 102*b* and 102*d* come into a non-conduction state.

In a period of T30 to T31, the reference signal generation unit 32 outputs the reference signal and the analog-to-digital conversion unit 31 performs analog-to-digital conversion. "f" in the figure represents an image signal of a conversion result.

Components of the imaging element 1 other than the above are the same as the components of the imaging element 1 in the first embodiment of the present disclosure. Therefore, explanation of the components is omitted.

As explained above, the imaging element 1 according to the third embodiment of the present disclosure generates an image signal obtained by adding up electric charges of the pixels 110 that generate image signals corresponding to kinds of incident light having different wavelengths.

4. Fourth Embodiment

The imaging element 1 according to the first embodiment explained above generates the first image signal and the added image signal. In contrast, the imaging element 1 according to a fourth embodiment of the present disclosure is different from the first embodiment explained above in that the imaging element 1 further generates a phase difference signal for detecting an image plane phase difference.

Configuration of the Pixel Block

Figure 11:
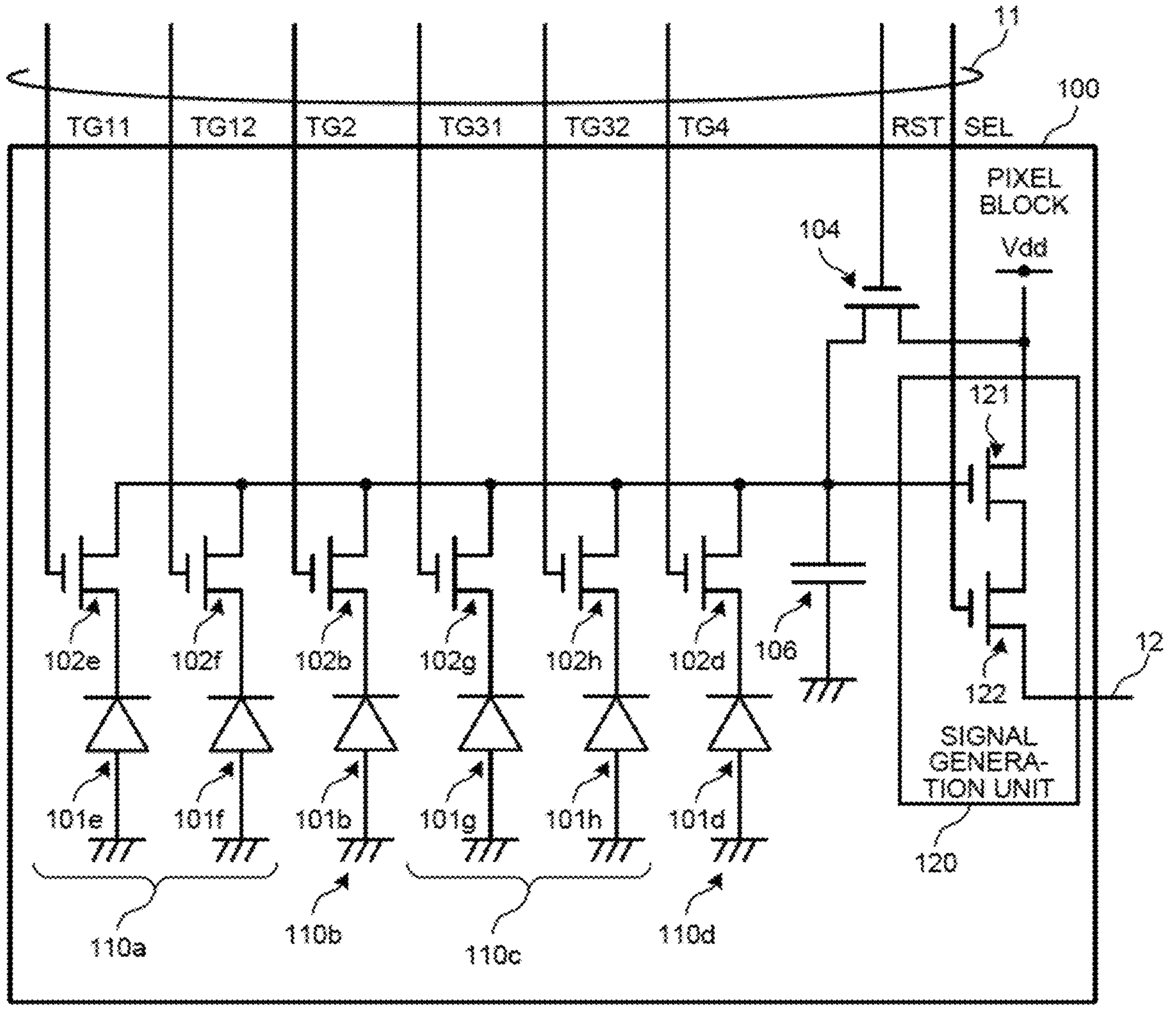
FIG. 11 is a diagram illustrating a configuration example of a pixel block according to a fourth embodiment of the present disclosure.

FIG. 11 is a diagram illustrating a configuration example of a pixel block according to the fourth embodiment of the present disclosure. Like FIG. 2, the figure is a circuit diagram illustrating a configuration example of the pixel block 100. Note that the pixel block 100 in the figure is different from the pixel block 100 in FIG. 2 in that each of the pixels 110*a* and 110*c* includes a plurality of photoelectric conversion units 101 and a plurality of electric charge transfer units 102.

The pixel 110*a* includes photoelectric conversion units 101*e* and 101*f* and electric charge transfer units 102*e* and 102*f*. The pixel 110*c* includes photoelectric conversion units 101*g* and 101*h* and electric charge transfer units 102*g* and 102*h*.

An anode of the photoelectric conversion unit 101*e* is grounded and a cathode of the photoelectric conversion unit 101*e* is connected to a source of the electric charge transfer unit 102*e*. An anode of the photoelectric conversion unit 101*f* is grounded and a cathode of the photoelectric conversion unit 101*f* is connected to a source of the electric charge transfer unit 102*f*. An anode of the photoelectric conversion unit 101*g* is grounded and a cathode of the photoelectric conversion unit 101*g* is connected to a source of the electric charge transfer unit 102*g*. An anode of the photoelectric conversion unit 101*h* is grounded and a cathode of the photoelectric conversion unit 101*h* is connected to a source of the electric charge transfer unit 102*h*.

Drains of the electric charge transfer units 102*e*, 102*f*, 102*g*, and 102*h* are connected to one end of the electric charge holding unit 106. Gates of the electric charge transfer units 102*e*, 102*f*, 102*g*, and 102*h* are respectively connected to signal lines TG11, TG12, TG31, and TG32.

The photoelectric conversion units 101*e* and 101*f* are photoelectric conversion units that subject a subject to pupil division. Similarly, the photoelectric conversion units 101*g* and 101*h* are photoelectric conversion units that subject the subject to the pupil division.

Configuration of a Plane of the Pixel Block

Figure 12:
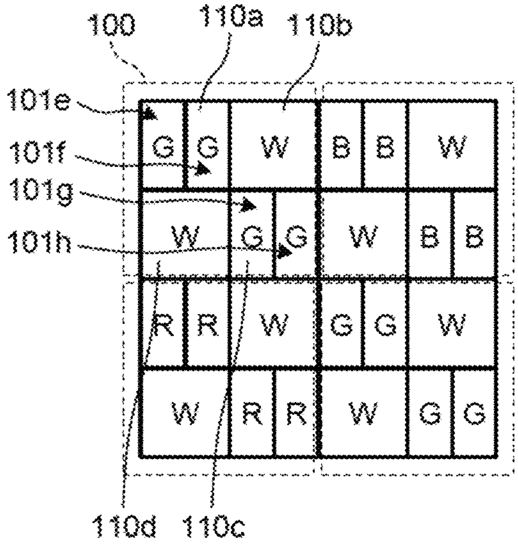
FIG. 12 is a diagram illustrating a configuration example of the pixel block according to the fourth embodiment of the present disclosure.

FIG. 12 is a diagram illustrating a configuration example of the pixel block according to the fourth embodiment of the present disclosure. The figure is a plan view illustrating a configuration example of the pixel block 100. As illustrated in the figure, the pixel 110*a* is subjected to the pupil division by the photoelectric conversion units 101*e* and 101*f*. Similarly, the pixel 110*c* is subjected to the pupil division by the photoelectric conversion units 101*g* and 101*h*. A phase difference signal can be generated by these pixels 110 subjected to the pupil division.

Transfer of Electric Charges of the Pixel Block

Figure 13:
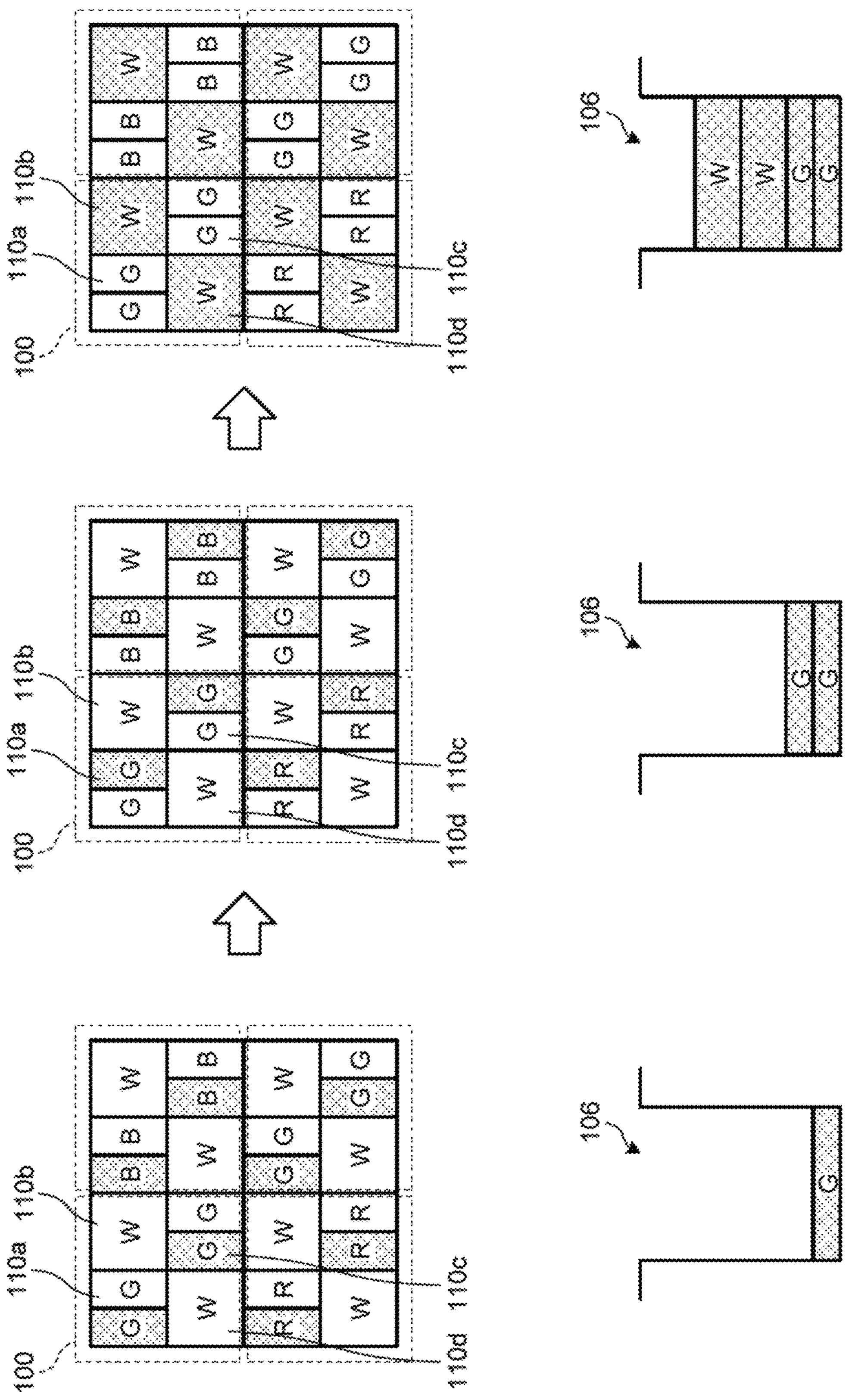
FIG. 13 is a diagram illustrating an example of transfer of electric charge of the pixel block according to the fourth embodiment of the present disclosure.

FIG. 13 is a diagram illustrating an example of transfer of electric charges of the pixel block according to the fourth embodiment of the present disclosure. Like FIG. 9, the figure is a diagram for explaining transfer of electric charges of the pixel 110 of the pixel block 100 after reset. The pixel block 100 in the upper left of the figure is explained as an example. First, electric charges of the photoelectric conversion unit 101*e* of the pixel 110*a* are transferred to the electric charge holding unit 106. At this time, an image signal is generated. Subsequently, electric charges of the photoelectric conversion unit 101*f* of the pixel 110*a* are transferred to the electric charge holding unit 106 and added. At this time, an image signal is generated. Subsequently, electric charges of the pixel 110*b* and the pixel 110*d* are transferred and added. At this time, an image signal is generated. In this manner, the pixel block 100 in the figure generates three image signals including a phase difference signal.

Generation of an Image Signal

Figure 14:
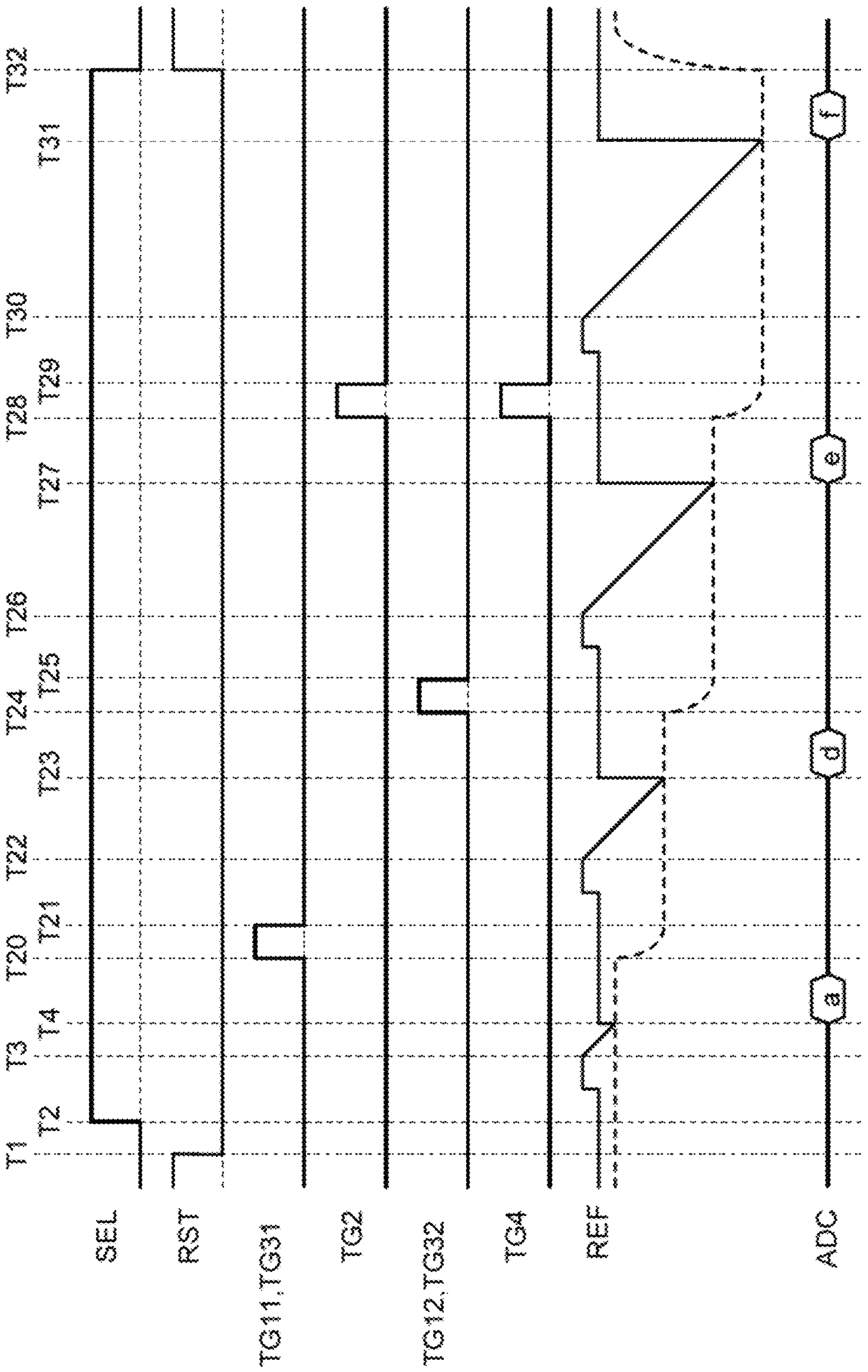
FIG. 14 is a diagram illustrating an example of generation of an image signal according to the fourth embodiment of the present disclosure.

FIG. 14 is a diagram illustrating an example of generation of an image signal according to the fourth embodiment of the present disclosure. Like FIG. 10, the figure is a timing chart illustrating an example of generation of the first image signal and the added image signal in the pixel block 100. The same processing procedure as the processing procedure illustrated in FIG. 11 can be applied except that the ON voltage is input to the TG11 and the TG31 in a period of T20 to T21 and the ON voltage is input to the TG12 and the TG32 in a period of T24 to T25. Note that a phase signal can be generated from an image signal of "d" and an image signal of "e" in the figure.

Components of the imaging element 1 other than the above are the same as the components of the imaging element 1 in the first embodiment of the present disclosure. Therefore, explanation of the components is omitted.

As explained above, the imaging element 1 according to the fourth embodiment of the present disclosure can generate the phase difference signal in the pixel block 100.

5. Fifth Embodiment

The imaging element 1 according to the first embodiment explained above generates the digital first image signal and the digital added image signal with one analog-digital conversion. In contrast, the imaging element 1 according to a fifth embodiment of the present disclosure is different from the first embodiment explained above in that an image signal is generated by performing a plurality of analog-to-digital conversions.

Generation of an Image Signal

Figure 15:
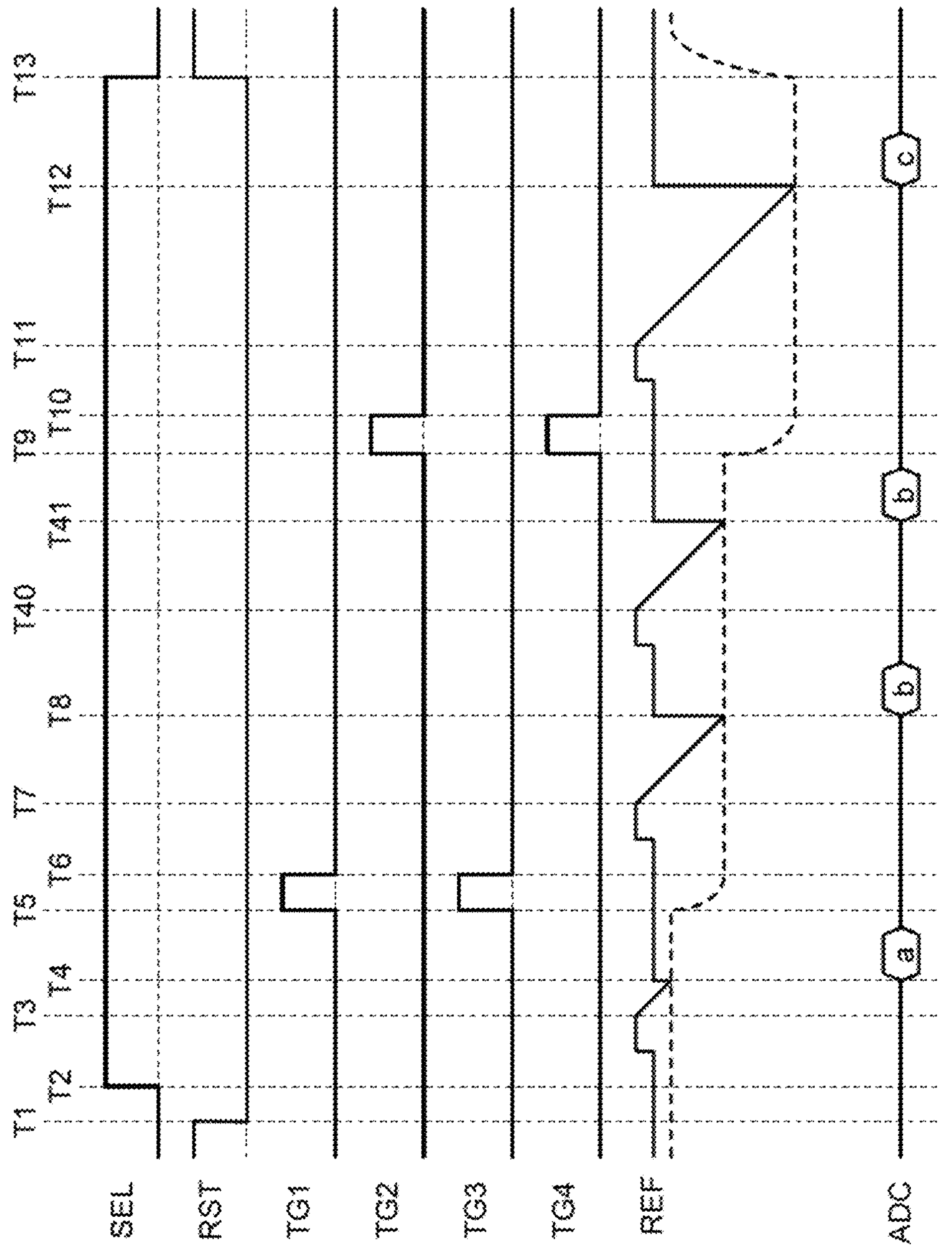
FIG. 15 is a diagram illustrating an example of generation of an image signal according to a fifth embodiment of the present disclosure.

FIG. 15 is a diagram illustrating an example of generation of an image signal according to the fifth embodiment of the present disclosure. Like FIG. 5, the figure is a timing chart illustrating an example of generation of the first image signal and the added image signal in the pixel block 100. A processing procedure illustrated in the figure is different from the processing procedure illustrated in FIG. 5 in that a processing procedure of T40 to T41 is added. In the processing procedure illustrated in the figure, after generation of an image signal of "b" in a period of T7 to T8, processing of T40 to T41 of the same procedure is performed to generate the image signal of "b" again.

Thereafter, an average of two image signals of "b" is calculated to generate the first image signal. Since noise of the two image signals is leveled, noise of the first image signal can be reduced.

Figure 16:
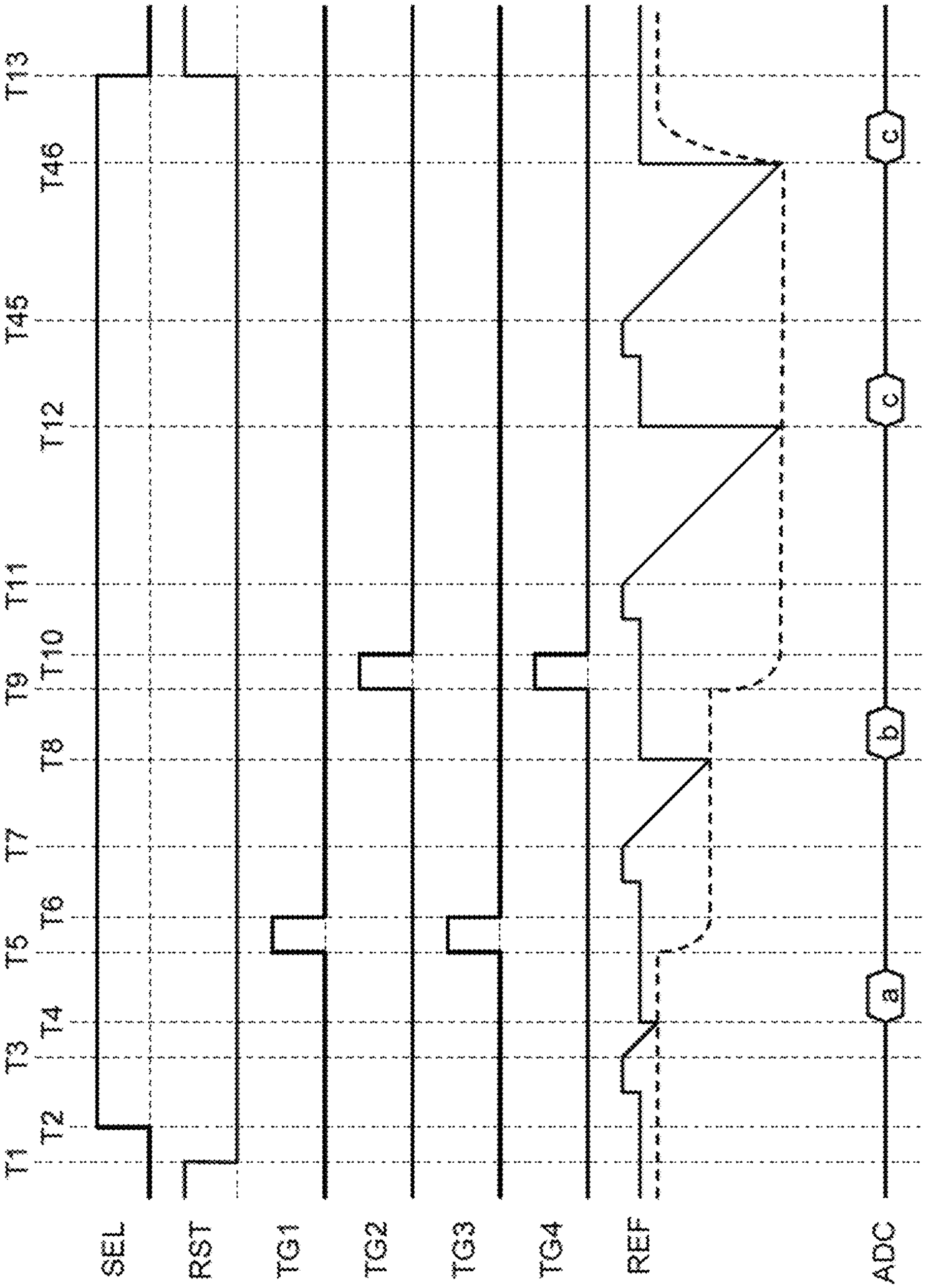
FIG. 16 is a diagram illustrating another example of the generation of the image signal according to the fifth embodiment of the present disclosure.

FIG. 16 is a diagram illustrating another example of the generation of the image signal according to the fifth embodiment of the present disclosure. Like FIG. 5, the figure is a timing chart illustrating an example of generation of the first image signal and the added image signal in the pixel block 100. A processing procedure illustrated in the figure is different from the processing procedure illustrated in FIG. 5 in that a processing procedure of T45 to T46 is added. In the processing procedure illustrated in the figure, after generation of an image signal of "c" in a period of T11 to T12, processing from T45 to T46 of the same procedure is performed to generate the image signal of "c" again.

Thereafter, an average of two image signals of "c" is calculated to generate the added image signal. Since noise of the two image signals is leveled, noise of the added image signal can be reduced.

Components of the imaging element 1 other than the above are the same as the components of the imaging element 1 in the first embodiment of the present disclosure. Therefore, explanation of the components is omitted.

As explained above, the imaging element 1 according to the fifth embodiment of the present disclosure can reduce noise by calculating an average of digital image signals generated by performing analog-digital conversion a plurality of times.

6. Sixth Embodiment

Variations of the pixel block 100 are explained.

Configuration of a Plane of the Pixel Block

Figure 17A:
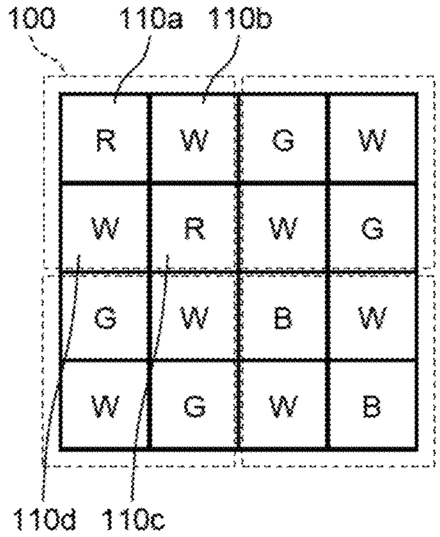
FIG. 17A is a diagram illustrating a configuration example of a pixel block according to a sixth embodiment of the present disclosure.
Figure 17B:
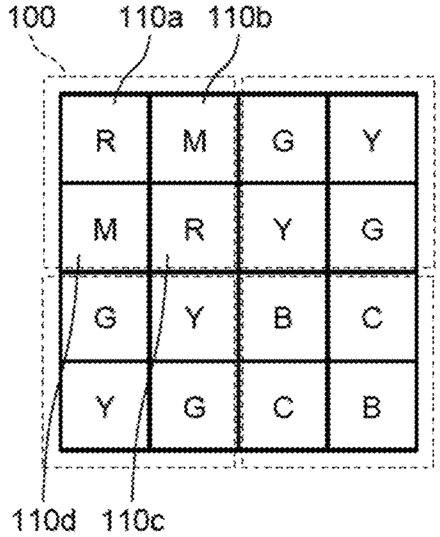
FIG. 17B is a diagram illustrating a configuration example of the pixel block according to the sixth embodiment of the present disclosure.
Figure 17C:
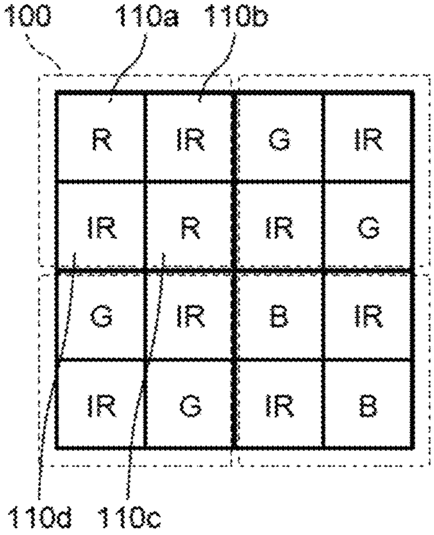
FIG. 17C is a diagram illustrating a configuration example of the pixel block according to the sixth embodiment of the present disclosure.

FIGS. 17A to 17C are diagrams illustrating configuration examples of a pixel block according to a sixth embodiment of the present disclosure. The figure is a plan view illustrating a configuration example of the pixel block 100.

FIG. 17A illustrates an example in which the arrangement of the pixels 110 is changed with respect to the pixel block 100 illustrated in FIG. 3.

FIG. 17B illustrates an example in which the arrangement of the pixels 110 is changed with respect to the pixel block 100 illustrated in FIG. 8.

FIG. 17C illustrates an example in which the pixels 110 that generate an image signal corresponding to infrared light are arranged instead of the pixels 110 that generate a W image signal of the pixel block 100 in FIG. 3. The pixels 110 added with "IR" in the figure represent the pixels 110 that generate the image signals corresponding to the infrared light.

Figure 18A:
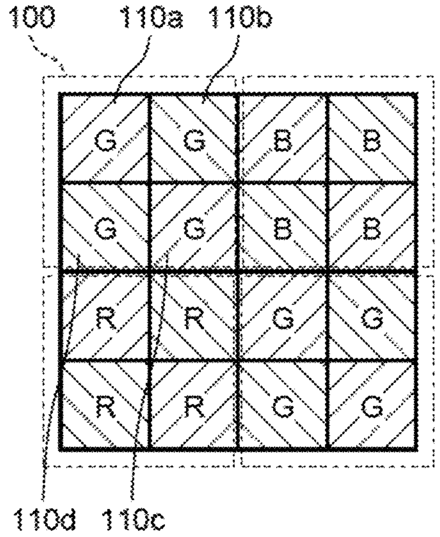
FIG. 18A is a diagram illustrating another configuration example of the pixel block according to the sixth embodiment of the present disclosure.
Figure 18B:
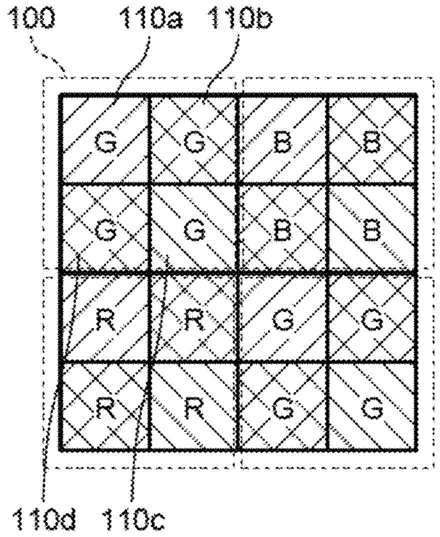
FIG. 18B is a diagram illustrating another configuration example of the pixel block according to the sixth embodiment of the present disclosure.

FIGS. 18A and 18B are diagrams illustrating other configuration examples of the pixel block according to the sixth embodiment of the present disclosure. The figure is a plan view illustrating a configuration example of the pixel block 100. An example in which an exposure time is changed for each pixel 110 is illustrated. Note that, in the pixel block 100 illustrated in the figures, the pixels 110 that generate image signals of the same color can be arranged.

In FIG. 18A, the pixels 110 at the upper right to which oblique hatching is added represent the pixels 110 having a relatively long exposure time. The pixels 110 at the lower right to which oblique hatching is added represent the pixels 110 having a relatively short exposure time.

In FIG. 18B, the pixels 110 to which half-tone dot meshing hatching is added represent the pixels 110 having an intermediate exposure time.

Figure 19:
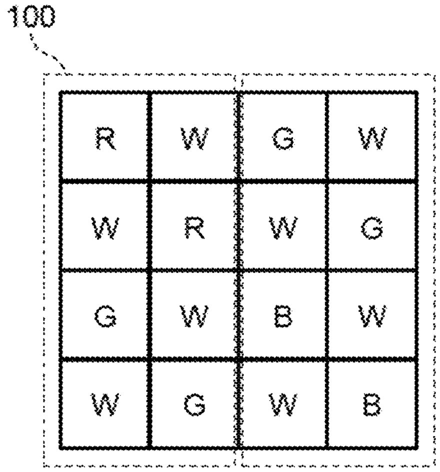
FIG. 19 is a diagram illustrating another configuration example of the pixel block according to the sixth embodiment of the present disclosure.

FIG. 19 is a diagram illustrating another configuration example of the pixel block according to the sixth embodiment of the present disclosure. Like FIG. 3, the figure is a plan view illustrating a configuration example of the pixel block 100. The figure illustrates an example of the pixel block 100 in which eight pixels 110 in 4 rows and 2 columns share the electric charge holding unit 106 and the signal generation unit 120.

Figure 20A:
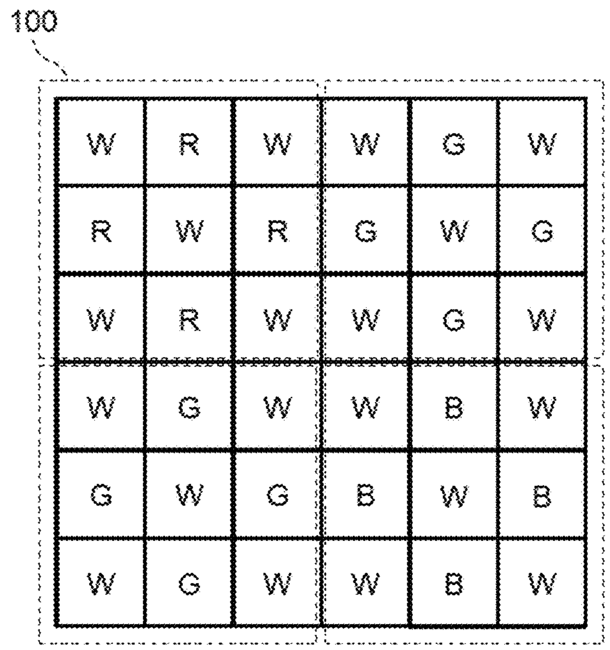
FIG. 20A is a diagram illustrating another configuration example of the pixel block according to the sixth embodiment of the present disclosure.
Figure 20B:
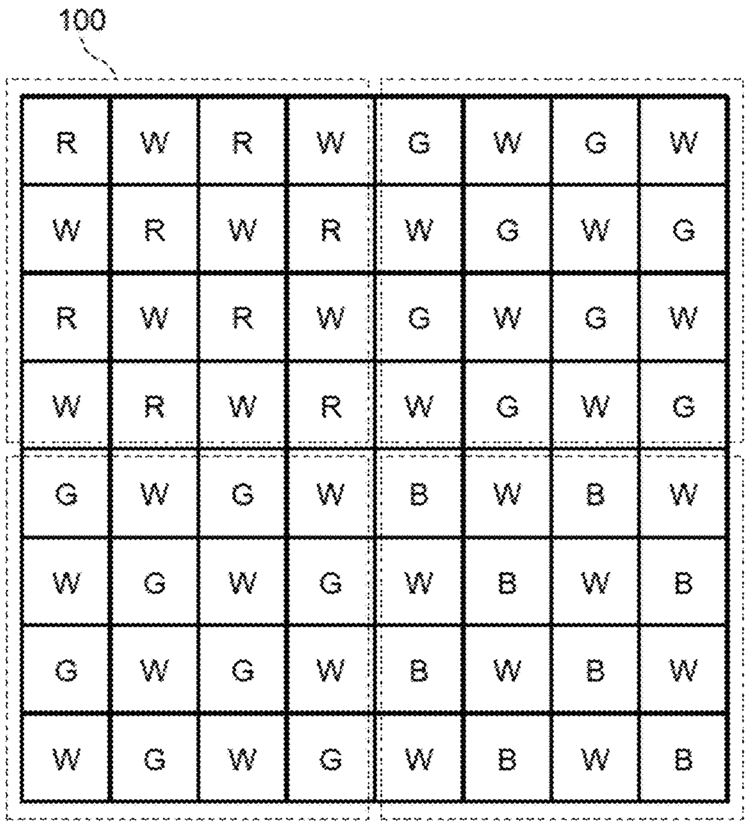
FIG. 20B is a diagram illustrating another configuration example of the pixel block according to the sixth embodiment of the present disclosure.

FIGS. 20A and 20B are diagrams illustrating other configuration example of the pixel block according to the sixth embodiment of the present disclosure. Like FIG. 3, the figure is a plan view illustrating a configuration example of the pixel block 100.

FIG. 20A illustrates an example of the pixel block 100 in which nine pixels 110 in 3 rows and 3 columns share the electric charge holding unit 106 and the signal generation unit 120.

FIG. 20B illustrates an example of the pixel block 100 in which sixteen pixels 110 in 4 rows and 4 columns share the electric charge holding unit 106 and the signal generation unit 120.

7. Imaging Device

The technique according to the present disclosure can be applied to various products. For example, the technique according to the present disclosure can be applied to an imaging device such as a camera.

Figure 21:
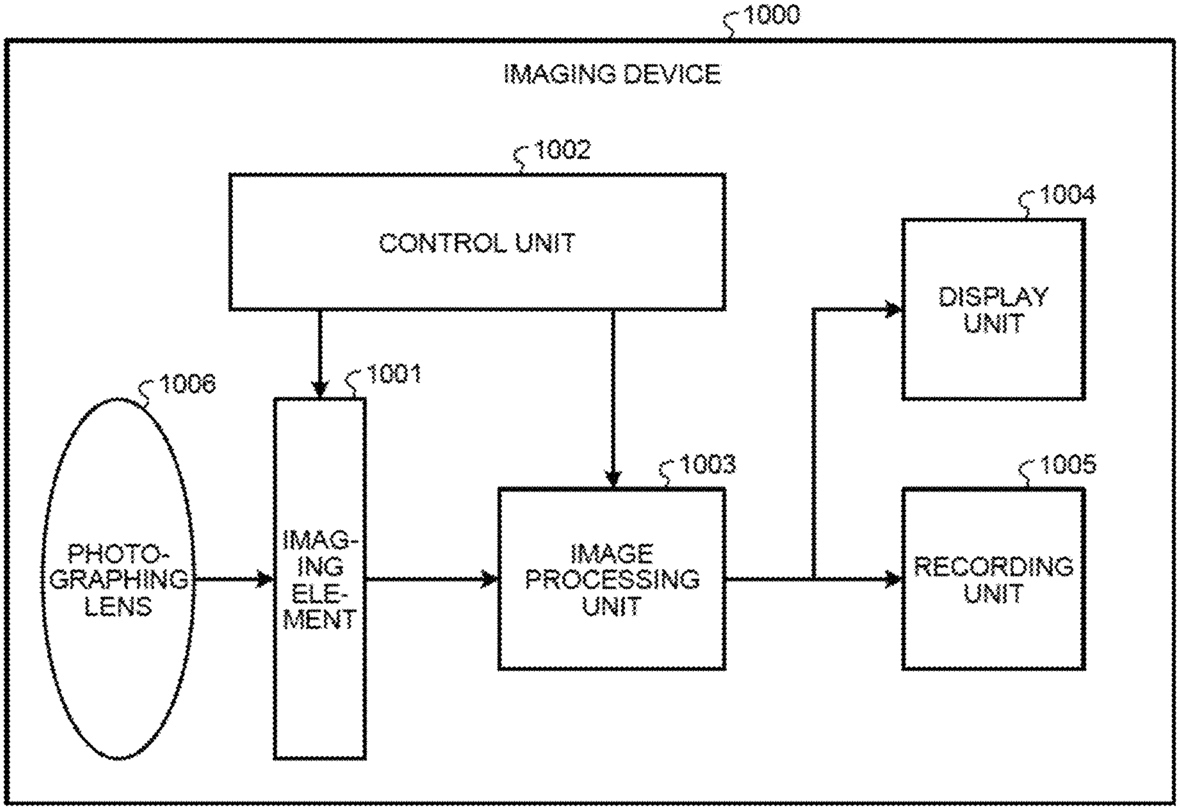
FIG. 21 is a diagram illustrating a configuration example of an imaging device to which the technique according to the present disclosure can be applied.

FIG. 21 is a view illustrating a configuration example of an imaging device to which the technology according to the present disclosure can be applied. An imaging device 1000 in the drawing includes an imaging element 1001, a control unit 1002, an image processing unit 1003, a display unit 1004, a recording unit 1005, and an imaging lens 1006.

The imaging lens 1006 is a lens that condenses light from a subject. The subject is imaged on the light receiving surface of the imaging element 1001 by the imaging lens 1006.

The imaging element 1001 is an element that images a subject. A plurality of pixels including a photoelectric conversion unit that performs photoelectric conversion of light from a subject is disposed on a light receiving surface of the imaging element 1001. Each of the plurality of pixels generates an image signal based on a charge generated by photoelectric conversion. The imaging element 1001 converts an image signal generated by the pixel into a digital image signal and outputs the digital image signal to the image processing unit 1003. Note that an image signal for one screen is referred to as a frame. The imaging element 1001 can also output an image signal in units of frames.

The control unit 1002 controls the imaging element 1001 and the image processing unit 1003. The control unit 1002 can include, for example, an electronic circuit using a microcomputer and the like.

The image processing unit 1003 processes an image signal from the imaging element 1001. The processing of the image signal in the image processing unit 1003 corresponds to, for example, demosaic processing of generating an image signal of a color that is insufficient when a color image is generated or noise reduction processing of removing noise of the image signal. The image processing unit 1003 can include, for example, an electronic circuit using a micro-computer and the like.

The display unit 1004 displays an image based on the image signal processed by the image processing unit 1003. The display unit 1004 can include, for example, a liquid crystal monitor.

The recording unit 1005 records an image (frame) based on the image signal processed by the image processing unit 1003. The recording unit 1005 can include, for example, a hard disk or a semiconductor memory.

The imaging device to which the present disclosure can be applied is explained above. The present technique can be applied to the imaging element 1001 among the components explained above. Specifically, the imaging element 1 explained with reference to FIG. 1 can be applied to the imaging element 1001. Note that the image processing unit 1003 is an example of an image processing circuit.

Note that the effects described in this specification are only illustrations and are not limited. Other effects may be present.

Note that the present technique can also take the following configurations.

(1)

An imaging element comprising:

a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation unit that generates an image signal based on the electric charges held by the electric charge holding unit;

a pixel block control unit that performs control to transfer the electric charges generated by the first pixel to the electric charge holding unit and cause the signal generation unit to generate a first image signal that is the image signal based on the electric charges and control to further transfer the electric charges generated by the second pixel to the electric charge holding unit in which the electric charges generated by the first pixel are held and cause the signal generation unit to generate an added image signal that is the image signal based on electric charges obtained by adding up the electric charges respectively generated by the first pixel and the second pixel; and a signal processing unit that includes a subtraction unit that generates a second image signal that is the image signal obtained by subtracting the first image signal from the added image signal, the signal processing unit switching a first mode for outputting the first image signal and the added image signal and a second mode for outputting the first image signal and the second image signal.

(2)

The imaging element according to the above (1), wherein the first pixel performs photoelectric conversion of any one of red light, green light, and blue light among the kinds of incident light.

(3)

The imaging element according to the above (1), wherein the second pixel performs photoelectric conversion of white light among the kinds of incident light.

(4)

The imaging element according to the above (1), wherein the second pixel performs photoelectric conversion of any one of yellow light, reddish violet light, and bluish green light among the kinds of incident light.

(5)

The imaging element according to the above (1), wherein the second pixel performs photoelectric conversion of infrared light among the kinds of incident light.

(6)

The imaging element according to any one of the above (1) to (5), wherein the pixel block is configured by a plurality of the first pixels and a plurality of the second pixels being arranged in a square matrix and the first pixels and the second pixels being alternately arranged in a row direction and a column direction.

(7)

The imaging element according to any one of the above (1) to (6), further comprising a reset unit that performs reset by discharging the electric charges of the electric charge holding unit, wherein the pixel block control unit further performs control to cause a reference image signal to be generated, the reference image signal being an image signal at a reset time by the reset unit, and the signal processing unit further corrects the first image signal by subtracting the reference image signal from the first image signal and corrects the added image signal by subtracting the reference image signal from the added image signal.

(8)

The imaging element according to any one of the above (1) to (7), wherein the first pixel includes a plurality of photoelectric conversion units for subjecting a subject to pupil division, and the pixel block control unit further performs control to transfer electric charges generated by any one of the plurality of photoelectric conversion units of the first pixel to the electric charge holding unit and cause the signal generation unit to generate an image signal based on the electric charges, and transfers electric charges generated by the plurality of photoelectric conversion units of the first pixel to the electric charge holding unit and causes the signal generation unit to generate an image signal based on the electric charges as the first image signal.

(9) The imaging element according to any one of the above (1) to (6), wherein the signal processing unit further includes an analog-to-digital conversion unit that converts the first image signal and the added image signal into a digital signal, and the signal processing unit outputs the first image signal and the added image signal of the digital signal converted by the analog-to-digital conversion unit.

(10)

The imaging element according to the above (9), wherein the signal processing unit generates and outputs the added image signal of the digital signal having a bit width aligned with a bit width of the first image signal of the digital signal.

(11)

The imaging element according to the above (10), wherein the signal processing unit deletes a most significant bit of the added image signal of the digital signal converted by the analog-to-digital conversion unit to thereby align the bit width of the added image signal with the bit width of the first image signal.

(12)

The imaging element according to the above (10), wherein the signal processing unit deletes a least significant bit of the added image signal of the digital signal converted by the analog-to-digital conversion unit to thereby align the bit width of the added image signal with the bit width of the first image signal.

(13)

The imaging element according to the above (9), wherein the pixel block control unit generates a plurality of at least one of the first image signals and the added image signals, the analog-to-digital conversion unit converts the plurality of first image signals or the plurality of added image signals into digital signals, and the signal processing unit outputs an average of the first image signals of a plurality of digital signals or the added image signals of the plurality of digital signals as the first image signal or the added image signal.

(14)

Electronic equipment comprising:

a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation unit that generates an image signal based on the electric charges held by the electric charge holding unit;

a pixel block control unit that performs control to transfer the electric charges generated by the first pixel to the electric charge holding unit and cause the signal generation unit to generate a first image signal that is the image signal based on the electric charges and control to further transfer the electric charges generated by the second pixel to the electric charge holding unit in which the electric charges generated by the first pixel are held and cause the signal generation unit to generate an added image signal that is the image signal based on electric charges obtained by adding up the electric charges respectively generated by the first pixel and the second pixel;

a signal processing unit that includes a subtraction unit that generates a second image signal that is the image signal obtained by subtracting the first image signal from the added image signal, the signal processing unit switching a first mode for outputting the first image signal and the added image signal and a second mode for outputting the first image signal and the second image signal; and a processing circuit that processes at least one of the first image signal, the added image signal, and the second image signal.

REFERENCE SIGNS LIST

1, 1001 IMAGING ELEMENT

20 VERTICAL DRIVE UNIT

30 COLUMN SIGNAL PROCESSING UNIT

31 ANALOG-TO-DIGITAL CONVERSION UNIT

34 SUBTRACTION UNIT

100 PIXEL BLOCK

101, **101*a*, 101*b*, 101*c*, 101*d*, 101*e*, 101*f*, 101*g*, 101*h*** PHOTOELECTRIC CONVERSION UNIT

**102*a*, 102*b*, 102*c*, 102*d*, 102*e*, 102*f*, 102*g*, 102*h*** ELECTRIC CHARGE TRANSFER UNIT

104 RESET TRANSISTOR

106 ELECTRIC CHARGE HOLDING UNIT

110, **110*a*, 110*b*, 110*c*, 110*d*** PIXEL

120 SIGNAL GENERATION UNIT

1000 IMAGING DEVICE

1003 IMAGE PROCESSING UNIT

The invention claimed is:

1. An imaging element comprising:

a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation circuit that generates an image signal based on the electric charges held by the electric charge holding unit;

a pixel block control circuit that performs control to transfer the electric charges generated by the first pixel to the electric charge holding unit and cause the signal generation circuit to generate a first image signal that is the image signal based on the electric charges and control to further transfer the electric charges generated by the second pixel to the electric charge holding unit in which the electric charges generated by the first pixel are held and cause the signal generation circuit to generate an added image signal that is the image signal based on electric charges obtained by adding up the electric charges respectively generated by the first pixel and the second pixel; and a signal processor configured to generate a second image signal that is the image signal obtained by subtracting the first image signal from the added image signal, the signal processor switching a first mode for outputting the first image signal and the added image signal and a second mode for outputting the first image signal and the second image signal wherein the first pixel includes a plurality of photoelectric conversion units for subjecting a subject to pupil division, and the pixel block control circuit further performs control to transfer electric charges generated by any one of the plurality of photoelectric conversion units of the first pixel to the electric charge holding unit and cause the signal generation circuit to generate an image signal based on the electric charges, and transfers electric charges generated by the plurality of photoelectric conversion units of the first pixel to the electric charge holding unit and causes the signal generation circuit to generate an image signal based on the electric charges as the first image signal.

2. Electronic equipment comprising the imaging element according to claim 1.

3. An imaging element comprising:

a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation circuit that generates an image signal based on the electric charges held by the electric charge holding unit;

a pixel block control circuit that performs control to transfer the electric charges generated by the first pixel to the electric charge holding unit and cause the signal generation circuit to generate a first image signal that is the image signal based on the electric charges and control to further transfer the electric charges generated by the second pixel to the electric charge holding unit in which the electric charges generated by the first pixel are held and cause the signal generation circuit to generate an added image signal that is the image signal based on electric charges obtained by adding up the electric charges respectively generated by the first pixel and the second pixel; and a signal processor configured to generate a second image signal that is the image signal obtained by subtracting the first image signal from the added image signal, the signal processor switching a first mode for outputting the first image signal and the added image signal and a second mode for outputting the first image signal and the second image signal wherein the signal processor further includes an analog-to-digital conversion unit that converts the first image signal and the added image signal into a digital signal, the signal processor outputs the first image signal and the added image signal of the digital signal converted by the analog-to-digital conversion unit, the signal processor generates and outputs the added image signal of the digital signal having a bit width aligned with a bit width of the first image signal of the digital signal, and the signal processor deletes a most significant bit of the added image signal of the digital signal converted by the analog-to-digital conversion unit to thereby align the bit width of the added image signal with the bit width of the first image signal.

4. Electronic equipment comprising the imaging element according to claim 3.

5. An imaging element comprising:

a pixel block including a first pixel that performs photoelectric conversion of incident light having a predetermined wavelength among kinds of incident light and generates electric charges, a second pixel that performs photoelectric conversion of incident light having a wavelength different from the wavelength of the first pixel and generates electric charges, an electric charge holding unit that holds the electric charges generated by the first pixel and the second pixel, and a signal generation circuit that generates an image signal based on the electric charges held by the electric charge holding unit;

a pixel block control circuit that performs control to transfer the electric charges generated by the first pixel to the electric charge holding unit and cause the signal generation circuit to generate a first image signal that is the image signal based on the electric charges and control to further transfer the electric charges generated by the second pixel to the electric charge holding unit in which the electric charges generated by the first pixel are held and cause the signal generation circuit to generate an added image signal that is the image signal based on electric charges obtained by adding up the electric charges respectively generated by the first pixel and the second pixel; and a signal processor configured to generate a second image signal that is the image signal obtained by subtracting the first image signal from the added image signal, the signal processor switching a first mode for outputting the first image signal and the added image signal and a second mode for outputting the first image signal and the second image signal wherein the signal processor further includes an analog-to-digital conversion unit that converts the first image signal and the added image signal into a digital signal, the signal processor outputs the first image signal and the added image signal of the digital signal converted by the analog-to-digital conversion unit, the signal processor generates and outputs the added image signal of the digital signal having a bit width aligned with a bit width of the first image signal of the digital signal, and the signal processor deletes a least significant bit of the added image signal of the digital signal converted by the analog-to-digital conversion unit to thereby align the bit width of the added image signal with the bit width of the first image signal.

6. Electronic equipment comprising the imaging element according to claim 5.

* * * * *